(12) United States Patent
Mitsuyoshi

(10) Patent No.: US 7,340,393 B2
(45) Date of Patent: Mar. 4, 2008

(54) EMOTION RECOGNIZING METHOD, SENSIBILITY CREATING METHOD, DEVICE, AND SOFTWARE

(75) Inventor: Shunji Mitsuyoshi, Shinagawa-ku (JP)

(73) Assignee: Advanced Generation Interface, Inc., Torrance, CA (US)

( * ) Notice: Subject to any disclaimer, the term of this patent is extended or adjusted under 35 U.S.C. 154(b) by 797 days.

(21) Appl. No.: 10/380,279

(22) PCT Filed: Sep. 4, 2001

(86) PCT No.: PCT/JP01/07646

§ 371 (c)(1),
(2), (4) Date: Mar. 12, 2003

(87) PCT Pub. No.: WO02/23524

PCT Pub. Date: Mar. 21, 2002

(65) Prior Publication Data

US 2003/0182123 A1    Sep. 25, 2003

(30) Foreign Application Priority Data

Sep. 13, 2000  (JP) .............................. 2002-278397
Jan. 16, 2001  (JP) ................................ 2001-7726

(51) Int. Cl.
*G10L 21/00*   (2006.01)
(52) U.S. Cl. .................. 704/207; 704/200; 704/272
(58) Field of Classification Search ................. 704/200, 704/207, 272
See application file for complete search history.

(56) References Cited

U.S. PATENT DOCUMENTS

| | | |
|---|---|---|
| 5,987,415 A | 11/1999 | Breese et al. |
| 6,249,780 B1 * | 6/2001 | Mizokawa .................... 706/23 |
| 6,430,523 B1 * | 8/2002 | Mizokawa .................. 702/182 |
| 6,638,217 B1 * | 10/2003 | Liberman .................... 600/300 |

(Continued)

FOREIGN PATENT DOCUMENTS

EP    0 978 790 A1    2/2000

(Continued)

OTHER PUBLICATIONS

The Influence of Speaker's Emotion on the Prosaic Features of Speech, Fujisaki et al., Science University of Tokyo, Mar. 14, 1995, pp. 1-4.

(Continued)

*Primary Examiner*—Daniel Abebe
(74) *Attorney, Agent, or Firm*—Squire, Sanders & Dempsey L.L.P.

(57) ABSTRACT

An object of the invention is to provide an emotion detecting method capable of detecting emotion of a human accurately, and provide sensibility generating method capable of outputting sensibility akin to that of a human. An intensity, a tempo, and intonation in each word of a voice are detected based on an inputted voice signal, amounts of change are obtained for the detected contents, respectively, and signals expressing each states of emotion of anger, sadness, and pleasure are generated based on the amounts of change. A partner's emotion or situation information is inputted, and thus instinctive motivation information is generated. Moreover, emotion information including basic emotion parameters of pleasure, anger, and sadness is generated, which is controlled based on the individuality information.

21 Claims, 10 Drawing Sheets

U.S. PATENT DOCUMENTS 6,901,390 B2 * 5/2005 Mizokawa .................. 706/14

FOREIGN PATENT DOCUMENTS

| EP | 1 072 297 A1 | | 1/2001 |
|----|----|----|----|
| JP | 5-12023 | | 1/1993 |
| JP | 6-139044 | | 5/1994 |
| JP | 8-339446 | | 12/1996 |
| JP | 09-022296 | | 1/1997 |
| JP | 10-143351 | | 5/1998 |
| JP | 11-119791 | | 4/1999 |
| JP | 11-265239 | | 9/1999 |
| JP | 2000-187435 | | 7/2000 |
| JP | 2000-222378 | | 8/2000 |
| WO | WO9931653 | * | 6/1999 |
| WO | WO 00/38808 | | 7/2000 |

OTHER PUBLICATIONS

"Evaluation of the Relation Between Emotional Concepts and Emotional Parameters in Speech", Moriyama et al., Journal of the Institute of Electronics, Information and Communication Engineers, D-11, vol. J82-D-11, No. 4, Apr. 1999, ABSTRACT.

Kansei Infromation and Media Processing Technology, Yoshinori Kitahara, Journal of the Institute of Electronics, Information and Communication Engineers, vol. 81, No. 1, Jan. 1998, ABSTRACT.

L.S. Chen, et al., "Multimodal Human Emotion/Expression Recognition", Proceedings of the 3rd IEEE International Conference on Automatic Face and Gesture Recognition, Apr. 14-16, 1998, pp. 366-371.

C.L. Lisetti, et al, Automation Facial Epxression Interpretation: Where Human-Computer Interaction, Artifical Intelligence and Cognitive Science Intersect, *Pragmatics and Cognition (Special Issue on Facial Information Processing: A Multidisciplinary Prespective)*, vol. 8(1), Jan. 28, 2000, pp. 185-235.

N. Tosa, et al., "Life-Like Communication Agent - Emotion Sensing Character 'MIC' and Feeling Session Character 'MUSE'", Proceedings of Multimedia, Jun. 17-23, 1996, pp. 12-19.

T. Yamada, et al., "Pattern Recognition of Emotion with Neural Netowrk", Proceedings of 1995 IEEE Int. Conf. on the Industrial Electronics, Control, and Instrumentation, Nov. 6, vol. 1, pp. 183-187.

PHYSTA Report 2.4, "Generation of Subsymbolic Representations in the Emotion Understanding Problem", Report for the TMR PHYSTA project, "Principled Hybrid Systems: Theory and Application", Jun. 2000, pp. 1-57.

* cited by examiner

EXAMPLE OF REACTION PATTERN MODEL
IN EMOTION REACTION PATTERN DB

EMOTION RECOGNIZING METHOD, SENSIBILITY CREATING METHOD, DEVICE, AND SOFTWARE

BACKGROUND OF THE INVENTION

1. Field of the Invention

The present invention relates to an emotion detecting method, a sensibility generating method, a system of the same and software for executing the same. The emotion detecting method of the present invention can be utilized for emotion detection in a medical field and for a variety of systems as a part of artificial intelligence and artificial sensibility. Furthermore, a sensibility generating method of the present invention can be utilized for a variety of systems used in many ways for controlling the sensibility of virtual humans and robots.

2. Description of the Related Art

Conventional arts related to the emotion detecting method of the present invention have been disclosed in, for example, Japanese Unexamined Patent Application Publication Nos. Hei5-12023, Hei9-22296, and Hei11-119791.

Japanese Unexamined Patent Application Publication No. Hei5-12023 discloses that the continuation time of voice, the formant frequency of voice, and the intensity of voice for each frequency are respectively detected as amounts of characteristic of the voice. Furthermore, this gazette also discloses that a difference between a reference signal and the respective amounts of characteristic is detected and emotion detection is made by fuzzy inference based on the detected difference amount.

Japanese Unexamined Patent Application Publication No. Hei9-22296 discloses that a generating rate of voices (the number of mora per unit time), a voice pitch frequency, sound volume, and voice spectrum are detected as amounts of characteristic of the voice. Furthermore, this gazette also discloses that emotions are detected based on the detected amounts of characteristic and results obtained by statistically processing HMM (Hidden Markov Model).

Japanese Unexamined Patent Application Publication No. Hei11-119791 discloses that emotions are detected based on a probability of phoneme spectrum in its transition state by utilizing HMM.

On the other hand, as conventional arts related to the sensibility generating method of the present invention, for example, "Emotion Generating System and Emotion Generating Method" disclosed in Japanese Unexamined Patent Application Publication No. Hei11-265239 is known.

Emotions which express the internal states of humans and the like change variously depending on situations at that time. Japanese Unexamined Patent Application Publication No. Hei11-265239 discloses the technology for realizing generation of emotions in unpredictable situations.

Specifically, situations are evaluated in view of the predictable situations, and system's own emotion is generated. In addition, emotions that were actually generated in the past and situations at that time are analyzed, and unpredictable collateral conditions peculiar to the respective situations and emotions corresponding thereto are learned. When a situation newly inputted satisfies the collateral conditions, emotions corresponding to the collateral conditions are outputted.

The states of the emotions generated by such a system are reflected on, for example, voices and images that are outputted.

SUMMARY OF THE INVENTION

However, the conventional emotion detecting method shows a low precision of detecting emotions, and cannot detect actual emotions of a human accurately even if it can detect emotions as to particularly limited languages. Accordingly, the emotion detecting method is put to practical use only for limited use in, for example, a relatively simple game machine.

It is an object of the present invention to provide an emotion detecting method capable of accurately detecting emotions of a human who is a subject.

Furthermore, the conventional emotion generating method merely generates emotions directly based on information concerning situations inputted. In actual humans, a variety of parameters including instinct, reason, individuality, and the like affect on one another complicatedly, resulting in variations of actions, speeches, expressions and the like. The conventional emotion generating method cannot precisely reflect the instinct, reason, individuality and the like on the results.

Instinct and emotion can be regarded as affectivity. In addition, the instinct becomes basic biological affectivity and motivation of its emotion generation. Furthermore, it is considered that humans do not directly output emotions, but they output sensibility controlled by the reason and the individuality.

It is another object of the present invention to provide a sensibility generating method capable of outputting sensibility more akin to that of a human.

According to a first aspect of the invention, an emotion detecting method for detecting an emotion of a subject includes the following steps: inputting a voice signal; detecting an intensity of a voice, a tempo expressing speed the voice emerges at, and intonation expressing an intensity-change pattern in each word the voice makes, based on the inputted voice signal, respectively; obtaining amounts of change in the intensity of the voice detected, the tempo of the voice, and the intonation in the voice, respectively; and generating signals expressing states of emotion including at least anger, sadness, and pleasure, respectively, based on the obtained amounts of change.

In the first aspect of the invention, the emotion is detected by allowing the respective amounts of change in the intensity, tempo, and intonation of the voice inputted from the subject to correspond to the states of emotion including anger, sadness, and pleasure, respectively. By using such a method, the emotion can be detected more precisely than in the conventional art.

According to a second aspect of the invention, the emotion detecting system for detecting an emotion of a subject includes: a voice inputting unit for inputting a voice signal; an intensity detecting unit for detecting an intensity of a voice based on the voice signal inputted by the voice inputting unit; a tempo detecting unit for detecting speed the voice emerges at as a tempo based on the voice signal inputted by the voice inputting unit; an intonation detecting unit for detecting intonation expressing an intensity-change pattern in a word of the voice based on the voice signal inputted by the voice inputting unit; a change-amount detecting unit for obtaining amounts of change in the intensity of the voice detected by the intensity detecting unit, the tempo of the voice detected by the tempo detecting unit, and the intonation in the voice detected by the intonation detecting unit, respectively; and an emotion detecting unit for outputting signals expressing states of emotion including at least anger, sadness, and pleasure, respectively, based on the amounts of change detected by the change-amount detecting unit.

In the emotion detecting system of the second aspect of the invention, the voice inputting unit, the intensity detecting unit, the tempo detecting unit, the intonation detecting unit, the change-amount detecting unit, and the emotion detecting unit are provided, whereby the foregoing emotion detecting method can be executed.

According to a third aspect of the invention, the emotion detecting system of the second aspect of the invention in which the intonation detecting unit includes: a bandpass filter unit for extracting specific frequency components from the voice signal which is inputted separately for each word; an area separating unit for separating power spectrum of the signal which is extracted by the bandpass filter unit into a plurality of areas based on the intensity of the power spectrum; and an intonation calculating unit for calculating a value of the intonation based on time intervals between respective centers of the plurality of areas separated by the area separating unit.

The bandpass filter unit extracts the specific frequency components from the voice signal separated for each word and inputted thereto. The area separating unit separates the detected power spectrum into the plurality of areas, based on the intensity thereof. The intonation calculating unit calculates the value of the intonation based on the time intervals between the respective centers of the plurality of areas separated by the area separating unit.

In the third aspect of the invention, an energy distribution pattern in a word concerning the specific frequency components of the voice is detected as a value of time expressing the intervals of the plurality of areas, and the length of the time is utilized as the intonation.

According to a fourth aspect of the invention, the emotion detecting system of the second aspect of the invention further includes: an imaging unit for receiving image information concerning at least a face of the subject; an image recognition unit for detecting positional information concerning each part of the face based on the image information received by the imaging unit; an image reference information retaining unit for retaining reference information concerning an amount of characteristic in each part of the face; and an image characteristic amount detecting unit for detecting an image characteristic amount based on the positional information detected by the image recognition unit and the reference information retained by the image reference information retaining unit. The emotion detecting unit estimates a state of emotion according to a change in the image characteristic amount detected by the image characteristic amount detecting unit.

In the fourth aspect of the invention, in addition to the voice, the state of emotion is estimated based on an expression of the subject's face. Generally, since the states of emotion of humans are reflected on expressions of their faces, the states of emotion can be grasped by detecting the expressions of their faces. Accordingly, in the fourth aspect of the invention, the emotion detecting unit estimates the state of emotion based on the change in the image characteristic amount detected by the image characteristic amount detecting unit.

According to a fifth aspect of the invention, the emotion detecting system of the second aspect of the invention further includes: an emotion information storing unit for sequentially receiving pieces of information concerning the states of emotion detected by the emotion detecting unit and for storing the pieces of information therein; and an oblivion processing unit for deleting information which has been stored for a predetermined period of time since the information was initially stored, among the pieces of information concerning states of emotion stored in the emotion information storing unit in the past, and for excluding at least information showing a larger amount of change in emotion than a predetermined amount and information matching a predetermined change pattern, from the information to be deleted.

In the fifth aspect of the invention, it is possible to store the information concerning the detected states of emotion in the past in the emotion information storing unit. Furthermore, since the old information which has been stored for a long period of time since its detection, is automatically deleted from the emotion information storing unit, it is possible to reduce storage capacitance required for the emotion information storing unit.

However, characteristic information such as the information showing a larger amount of change in emotion than the predetermined amount and the information matching the predetermined change pattern are automatically excluded from the information to be deleted. Therefore, the characteristic information is retained as it is in the emotion information storing unit even when it gets old. Accordingly, similarly to a memory of a human, the characteristic information, which may be useful in the future, can be read from the emotion information storing unit to be reproduced even when it gets old.

According to a sixth aspect of the invention, the emotion detecting system of the fifth aspect of the invention further includes: a sentence recognition unit for executing grammar analysis by processing information concerning the voice uttered by the subject or characters inputted by the subject, and for generating speech information expressing a meaning of a sentence; and a storage controlling unit for storing the speech information generated by the sentence recognition unit in the emotion information storing unit in synchronous with the information concerning the states of emotion.

The sentence recognition unit processes the information concerning the voice uttered by the subject or the characters inputted by the subject with a keyboard or the like, and performs the grammar analysis to generate the speech information expressing the meaning of the sentence.

The grammar analysis makes it possible to obtain the speech information expressing, for example, "5W3H", that is, "Who", "What", "When" "Where", "Why", "How", "How long, How far, How tall and so on", and "How much".

The storage controlling unit stores the speech information generated by the sentence recognition unit in the emotion information storing unit in a state where the speech information is synchronous with the information concerning the states of emotion.

In the sixth aspect of the invention, by referring to the emotion information storing unit, not only the information concerning the emotion at any time point in the past but also the speech information expressing situations at the time can be taken out.

The information retained in the emotion information storing unit can be utilized in a variety of usages. For example, when an emotion estimating function of the emotion detecting system itself is inaccurate, a database which is used for estimating the emotion can be corrected based on the past result of detection retained in the emotion information storing unit.

According to a seventh aspect of the invention, the emotion detecting system of the second aspect of the invention further includes: a voiceless time determining unit for determining a reference voiceless time based on a state of emotion among the states of emotion detected; and a sentence segmentation detecting unit for detecting a segmentation of sentence of the voice by utilizing the reference voiceless time determined by the voiceless time determining unit.

When performing the recognition of the voice and the detection of the emotion, the segmentation for each sentence must be detected, and each sentence must be extracted. In general, since a voiceless section exists in the segmentation between the sentences, a plurality of sentences may be separated at timings when the voiceless sections appear.

However, the lengths of the voiceless sections are not constant. Particularly, the length of the voiceless section changes corresponding to the state of emotion of a speaker. Therefore, when a certain threshold is allocated in order to determine the voiceless section, the possibility of failure in detecting the segmentation of the sentence becomes high.

In the seventh aspect of the invention, the reference voiceless time is determined, for example, based on the state of emotion detected just before the determination, and the segmentation of sentence of the voice is detected according to the reference voiceless time. Accordingly, it is possible to detect the segmentation of the sentence correctly even when the emotion of the speaker changes.

According to an eighth aspect of the invention, software including an emotion detecting program executable by a computer for detecting an emotion of a subject in which the emotion detecting program includes: a step of inputting a voice signal into the emotion detecting program; a step of detecting an intensity of a voice, a tempo expressing speed the voice emerges at, and intonation expressing an intensity-change pattern in each word the voice makes, based on the voice signal inputted; a step of obtaining amounts of change in each of the intensity of the voice, the tempo of the voice, and the intonation in the voice, which are detected; and a step of generating signals expressing states of emotion of at least anger, sadness, and pleasure, respectively, based on the obtained amounts of change.

It is possible to implement the emotion detecting method of the first aspect of the invention by executing, with a computer, the emotion detecting program included in the software of the eighth aspect of the invention.

According to a ninth aspect of the invention, a sensibility generating method includes the steps of: retaining beforehand pieces of individuality information determining at least reason, a predetermined characteristic, and will of a subject that generates sensibility; generating instinctive motivation information including at least a first instinct parameter expressing a degree of pleasure, a second instinct parameter expressing a degree of danger, and a third instinct parameter expressing a degree of achievement and change, based on an inputted situation information which indicates a state of a partner's emotion or an environment the partner is in; generating emotion information including a basic emotion parameter of at least pleasure, anger, and sadness, based on the instinctive motivation information generated; and controlling the emotion information generated based on the individuality information.

In the ninth aspect of the invention, the instinctive motivation information that motivates the generation of emotion is generated based on the inputted situation information (the emotion, will, and circumstance of the partner). Specifically, the instinctive motivation information is generated from the situation information, and the emotion information is generated based on the instinctive motivation information. Furthermore, the emotion information to be generated is controlled based on the individuality information. Therefore, the emotion controlled by the reason and will of the individual, that is, sensibility information, can be outputted.

In addition, since the emotion information is generated through the instinctive motivation information, the emotion to be generated can be controlled more precisely and easily.

For example, an emotion generated when a human encounters a dangerous situation in a state of already recognizing the dangerous situation and an emotion generated when the human suddenly encounters the dangerous situation in a state of not recognizing the danger at all are different. It is possible to reproduce such a difference in the emotions.

It is preferable to allow the instinct parameter to further include a degree of attention (degree of refusal), a degree of certainty (degree of puzzlement), a degree of follow-up (degree of assertion) and the like in addition to the foregoing items. Furthermore, it is preferable to allow the basic emotion parameter constituting the emotion information to further include surprise, fear, suffering, disgust, contempt, approach, escape, jealousy, envy, dependence, irritation, anxiety and the like in addition to the foregoing items.

According to a tenth aspect of the invention, a sensibility generator includes: an instinct determining unit for inputting episode situation information indicating states of a partner's emotion, an environment the partner is in, and the partner's will, and for generating instinctive motivation information including at least a first instinct parameter expressing a degree of pleasure, a second instinct parameter expressing a degree of danger, and a third instinct parameter expressing a degree of achievement or change, based on the episode situation information; an emotion generating unit for generating emotion information including basic emotion parameters of at least pleasure, anger, and sadness, based on the instinctive motivation information outputted from the instinct determining unit; an individuality information providing unit for providing individuality information which determines at least reason and will with sensibility of a subject that generates sensibility; and an emotion controlling unit for controlling emotion information outputted from the emotion generating unit, based on the individuality information provided from the individuality information providing unit.

In the tenth aspect of the sensibility generator of the invention, it is possible to execute the sensibility generating method according to claim 9 by providing instinct determining unit, emotion generating unit, individuality information providing unit, and emotion controlling unit.

Accordingly, it is possible to output emotion controlled by reason and will of an individual, that is, information on sensibility. Furthermore, since emotion information is generated through instinctive motivation information, emotion to be generated can be controlled more precisely and easily.

According to an eleventh aspect of the invention, the emotion generating unit of the tenth aspect of the invention includes: a life rhythm generating unit for generating information expressing an environment changing periodically or a life rhythm of a living body; and a voluntary emotion controlling unit for controlling voluntary emotion in the emotion generating unit according to the information on the life rhythm outputted by the life rhythm generating unit.

For example, natural environment conditions such as temperature and humidity change periodically, though irregularly, concurrent with changes of weather, season, time and the like. Furthermore, it is considered that respective humans have a rhythm of body, a rhythm of emotion, a rhythm of intelligence and the like individually. The rhythm changing periodically is considered to have various influences on the actual emotions of the humans.

In the eleventh aspect of the invention, the voluntary emotion controlling unit controls the voluntary emotion in the emotion generating unit according to the information on the life rhythm outputted by the life rhythm generating unit. Accordingly, the emotion to be outputted can be changed in accordance with the environment or the life rhythm of the living body.

According to a twelfth aspect of the invention, the sensibility generator of the tenth aspect of the invention in which the emotion generating unit includes: an instinct-to-emotion information retaining unit for retaining pattern information which allows the basic emotion parameter and the instinctive motivation information to correspond to each other; and a matching probability learning unit for outputting information expressing a probability of matching/mismatching of the instinctive motivation information with the pattern information of the instinct-to-emotion information retaining unit, the instinctive motivation information being outputted from the instinct determining unit.

In the twelfth aspect of the invention, it is possible to obtain the probability of matching of the instinctive motivation information with the pattern information from the matching probability learning unit to utilize it as a determination factor of the emotion.

For example, when a mental condition of a human changes from a first state to a second state, the mental condition transits via a third state on its way from the first state to the second state. Accordingly, there is a possibility that the mental condition temporarily be matched with certain pattern information in the third state. However, the pattern information matched with the mental condition in the third state does not show a value of high utility. By utilizing the probability of the matching obtained by the matching probability learning unit, the generation of emotion of the pattern information with a low probability can be suppressed.

According to a thirteenth aspect of the invention, the sensibility generator of the tenth aspect of the invention in which the emotion generating unit includes an emotion feedback controlling unit for inputting to the emotion generating unit at least its own emotion information finally generated, and for reflecting the finally generated information on its own emotion information to be generated subsequently.

It is considered that inputting of various motivations causes emotion of a human to make chain changes. For example, a degree of anger which is emotion generated when a motivation is given to a person in a normal state so as to make him angry and a degree of anger which is emotion generated when a motivation is given to a person who has been already angry so as to make him further angry are different greatly from each other.

In the thirteenth aspect of the invention, the provision of the emotion feedback controlling unit allows the state of emotion generated just before the feedback to be brought back to an input and the state of emotion to be reflected on an emotion to be generated subsequently. Accordingly, it is possible to generate an emotion more akin to that of a human.

According to a fourteenth aspect of the invention, the sensibility generator of the tenth aspect of the invention has a feature in which the emotion controlling unit reflects information of a life rhythm, which is an individuality of a subject that generates sensibility, on the emotion information to be inputted.

In the fourteenth aspect of the invention, the information of the life rhythm can be reflected on the sensibility. For example, a difference occurs in a result of determination made by reason and the like, depending on whether a human is willing to do something. Such a difference in the sensibility can be reproduced by the reflection of the life rhythm.

According to a fifteenth aspect of the invention, the sensibility generator of the tenth aspect of the invention further includes: a knowledge database for storing situation information showing a past situation, a past episode, and a result of the past situation and episode; a knowledge collating unit for retrieving and extracting past situation information analogous to newly inputted situation information from the knowledge database, and for providing the past situation information to the emotion controlling unit; and a data update controlling unit for updating contents of the knowledge database based on the situation information showing a newly inputted situation and a result of the new situation, and for automatically deleting, from the knowledge database, situation information of low priority in the order of time in accordance with weight of the contents.

In the fifteenth aspect of the invention, the situation information showing the past situation and the result thereof is stored in the knowledge database. For example, information showing a situation of a certain episode and whether a final result of the episode has succeeded is stored. Therefore, the situation information in the past analogous to that of the present situation can be acquired from the knowledge database to be utilized for controlling the emotion.

Incidentally, newly generated information must be added sequentially to the knowledge database with elapse of time. However, a storage capacity of a system constituting the knowledge database is limited. Moreover, as an amount of the information stored is increased, a processing speed is lowered.

However, in the fifteenth aspect of the invention, the situation information of low priority is automatically deleted form the knowledge database in the order of time, by the control of the data update controlling unit. Therefore, a result similar to oblivion of a human can be realized, and shortage of the storage capacity and lowering of the processing speed can be prevented.

According to a sixteenth aspect of the invention, the tenth aspect of the sensibility generator of the invention further includes: a voice inputting unit for inputting a voice signal; an intensity detecting unit for detecting an intensity of a voice based on the voice signal inputted by the voice inputting unit; a tempo detecting unit for detecting speed the voice emerges at as a tempo based on the voice signal inputted by the voice inputting unit; an intonation detecting unit for detecting intonation expressing an intensity-change pattern in a word of the voice, based on the voice signal inputted by the voice inputting unit; a change-amount detecting unit for obtaining amounts of change in the intensity of the voice detected by the intensity detecting unit, the tempo of the voice detected by the tempo detecting unit, and the intonation in the voice detected by the intonation detecting unit, respectively; and an emotion detecting unit for outputting signals expressing states of emotion of at least anger, sadness, and pleasure, respectively, based on the amounts of change detected by the change-amount detecting unit.

In the sixteenth aspect of the invention, the partner's state of emotion can be detected based on the amount of characteristic extracted from the voice. Accordingly, a self emotion in accordance with the partner's emotion can be generated.

According to a seventeenth aspect of the invention, the sensibility generator of the sixteenth aspect of the invention further includes: a voice recognition unit for recognizing the voice inputted from the voice inputting unit, and for outputting character information; and a natural language processing unit for subjecting vocal information recognized by the voice recognition unit to natural language processing, and for generating meaning information expressing a meaning of the inputted voice.

In the seventeenth aspect of the invention, the meaning information concerning the word spoken by the partner is obtained, and thus a result obtained by understanding the meaning information can be reflected on the self sensibility.

According to an eighteenth aspect of the invention, software including a program and data executable by a computer utilized for sensibility generation control in which the program includes; a step of generating instinctive motivation information including at least a first instinct parameter expressing a degree of pleasure, a second instinct parameter expressing a degree of danger, and a third instinct parameter expressing a degree of achievement or change, based on an inputted situation information which indicates a state of a partner's emotion or an environment the partner is in; a step of generating emotion information including a basic emotion parameter of at least pleasure, anger, and sadness, based on the instinctive motivation information generated; a step of providing individuality information determining at least reason and will of a subject that generates sensibility; and a step of controlling the emotion information generated, based on the individuality information.

The software of the eighteenth aspect of the invention is inputted to a predetermined computer to execute the program, and thus the sensibility generating method of the ninth aspect of the invention can be implemented.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

First Embodiment

One embodiment relating to an emotion detecting method of the present invention will be described with reference to FIGS. 1 to 6.

Figure 1:
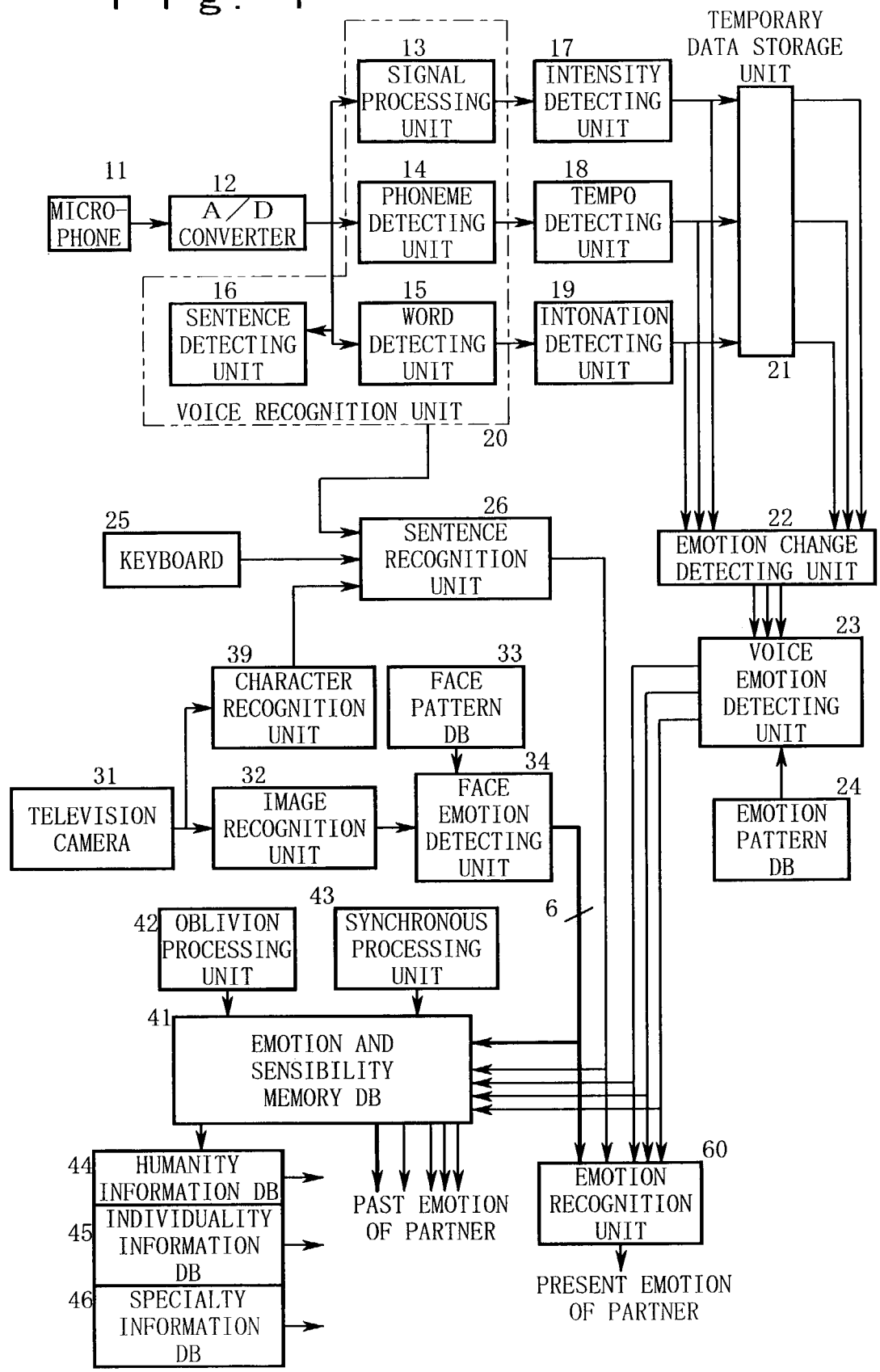
FIG. 1 is a block diagram illustrating a configuration of an emotion detecting system of an embodiment.
Figure 2:
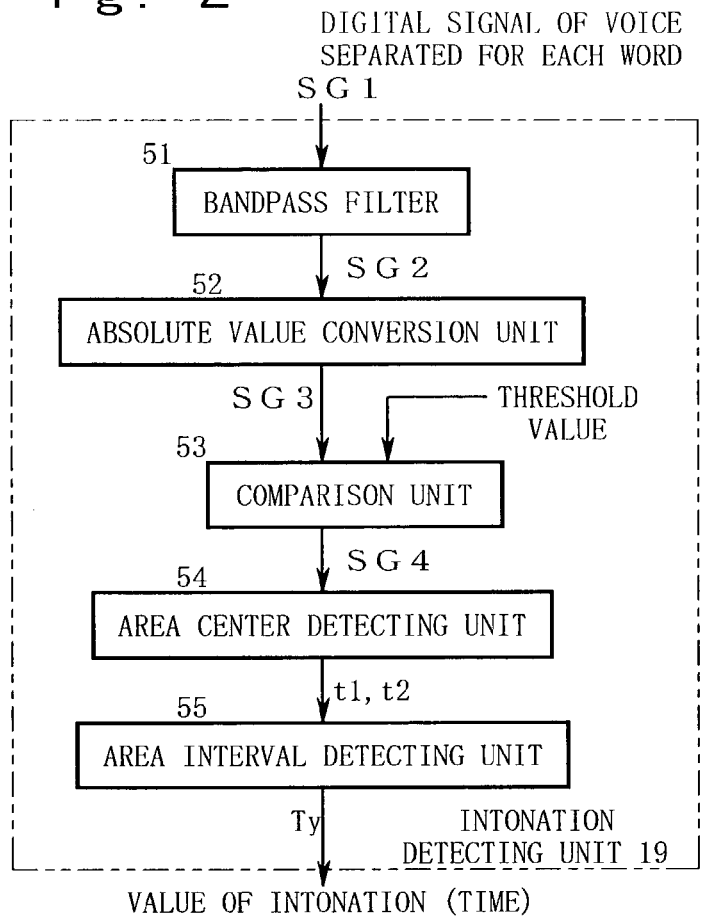
FIG. 2 is a block diagram illustrating a configuration of an intonation detecting unit.
Figure 3:
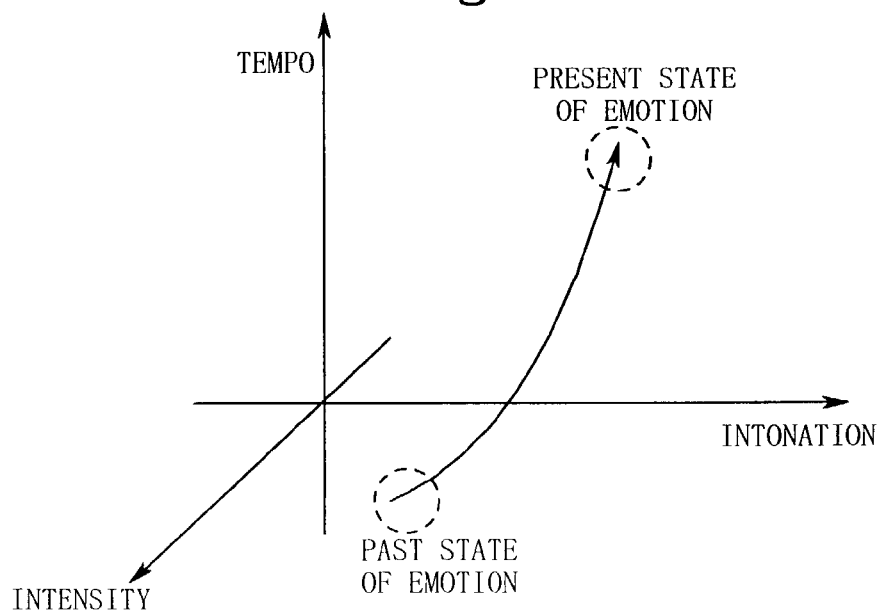
FIG. 3 is a graph illustrating a relation between a change of an emotion state and an intensity, tempo, and intonation of a voice.
Figure 4:
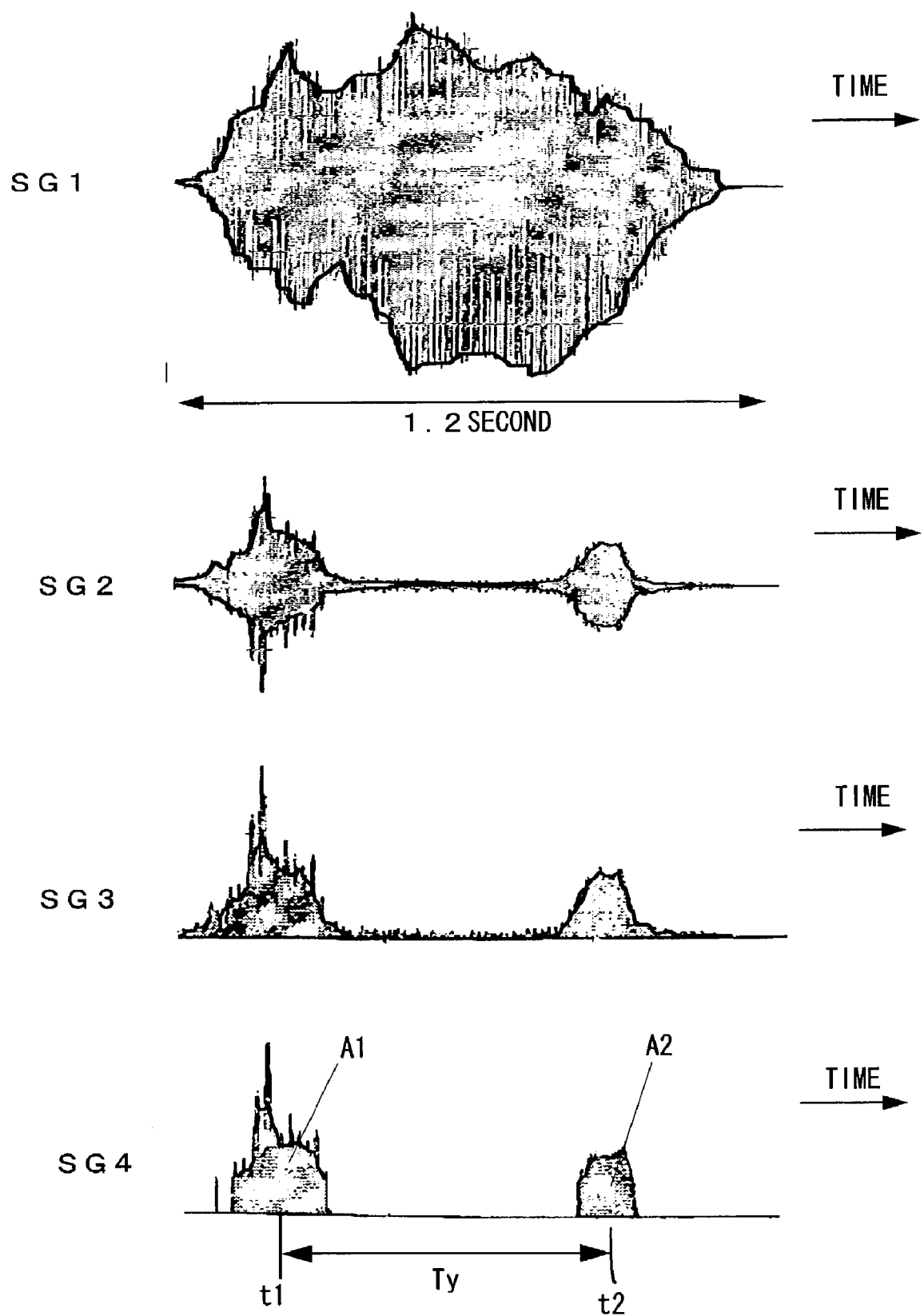
FIG. 4 is timing charts illustrating processes of a voice signal processing in the intonation detecting unit.
Figure 5:
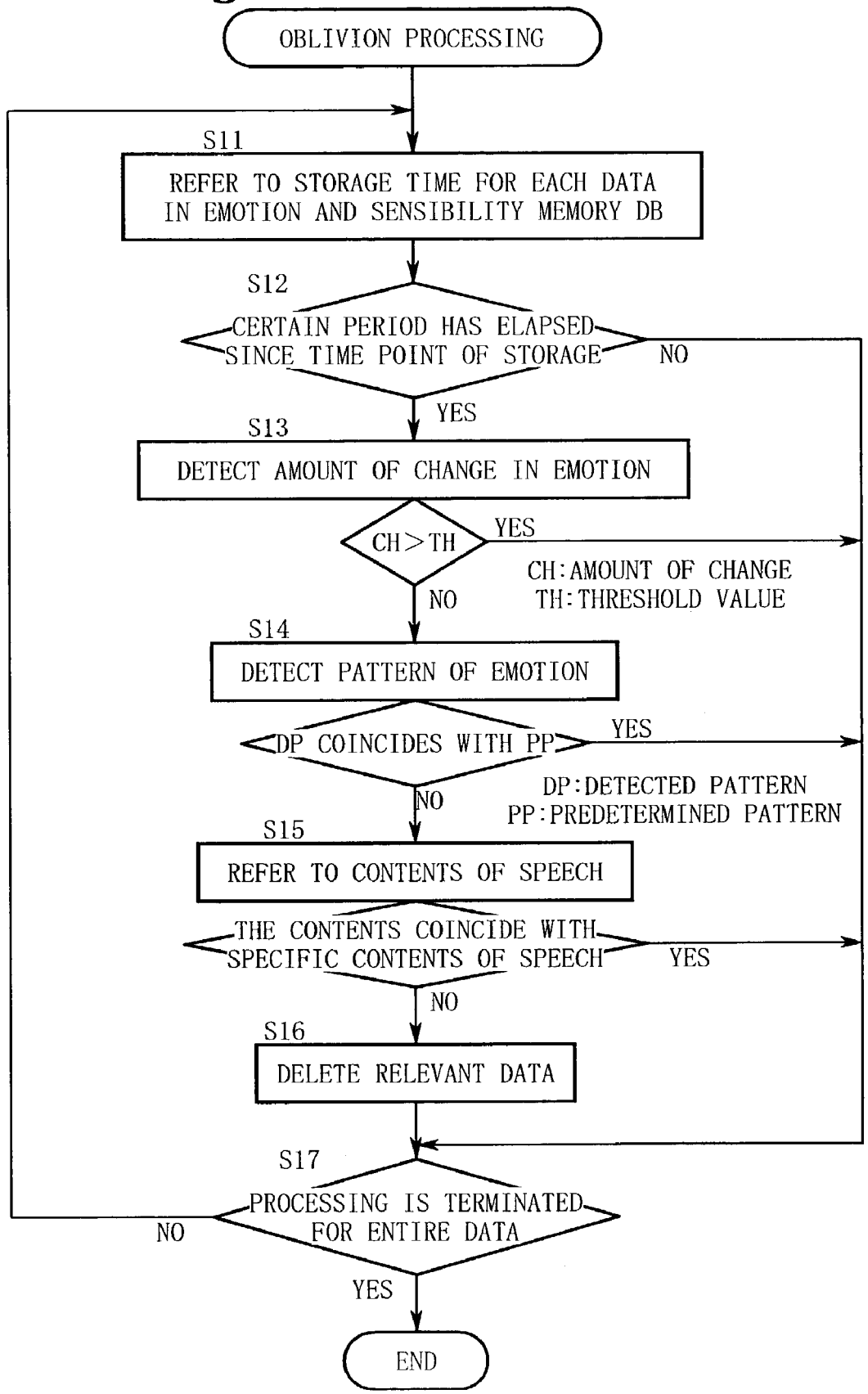
FIG. 5 is a flowchart illustrating an operation of an oblivion processing unit.
Figure 6:
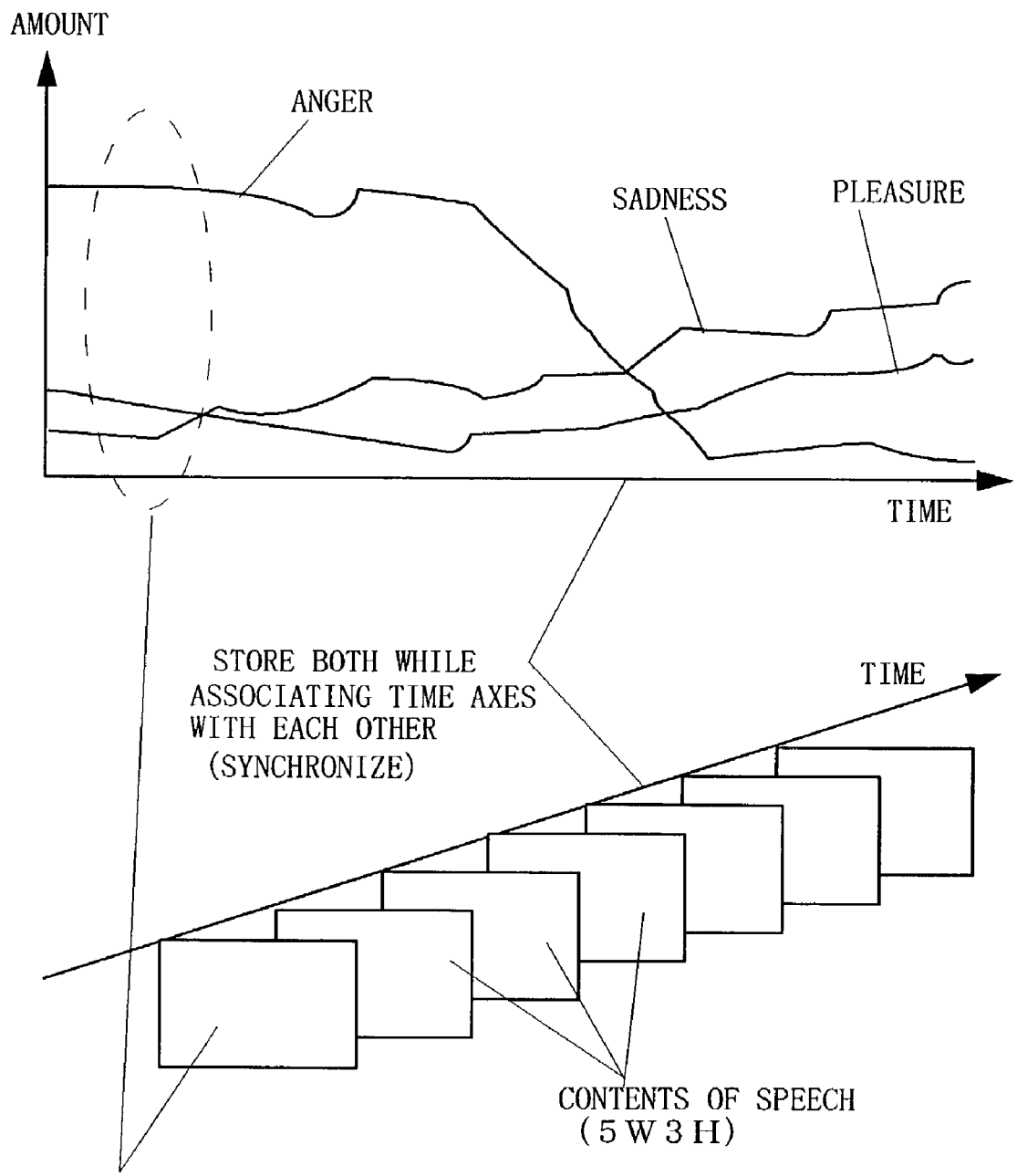
FIG. 6 is a schematic view illustrating a configuration example of information stored in an emotion and sensibility memory DB.

FIG. 1 is a block diagram illustrating a configuration of an emotion detecting system of this embodiment. FIG. 2 is a block diagram illustrating a configuration of an intonation detecting unit. FIG. 3 is a graph illustrating a relation between a change of an emotion state and an intensity, tempo, and intonation of a voice. FIG. 4 is timing charts illustrating processes of a voice signal processing in the intonation detecting unit. FIG. 5 is a flowchart illustrating an operation of an oblivion processing unit. FIG. 6 is a schematic view illustrating a configuration example of information stored in an emotion and sensibility memory DB.

Referring to FIG. 1, the emotion detecting system comprises: a microphone 11; an A/D converter 12; a signal processing unit 13; a voice recognition unit 20; an intensity detecting unit 17; a tempo detecting unit 18; an intonation detecting unit 19; a temporary data storage unit 21; an emotion change detecting unit 22; a voice emotion detecting unit 23; an emotion pattern database (hereinafter referred to as DB) 24; a keyboard 25; a sentence recognition unit 26; a television camera 31; an image recognition unit 32; a face pattern DB 33; a face emotion detecting unit 34; a character recognition unit 39; an emotion and sensibility memory DB 41; an oblivion processing unit 42; a synchronous processing unit 43; a humanity information DB 44; an individuality information DB 45; a specialty information DB 46; and an emotion recognition unit 60.

Furthermore, in the voice recognition unit 20, provided are a signal processing unit 13; a phoneme detecting unit 14; a word detecting unit 15; and a sentence detecting unit 16. The voice recognition unit 20 also includes a function of a voice recognizing (natural language processing) device sold at stores.

In FIG. 1, the voice recognition unit 20, the intensity detecting unit 17, the tempo detecting unit 18, the intonation detecting unit 19, the temporary data storage unit 21, the emotion change detecting unit 22 and the voice emotion detecting unit 23 are circuits for detecting an emotion from a voice.

The emotion detecting system comprises the microphone 11, the keyboard 25 and the television camera 31 as inputting unit for reading information of a human who is a partner for which emotion is detected. Specifically, the emotion of the human who is the partner is detected by utilizing a voice inputted from the microphone 11, character information inputted from the keyboard 25, and information including an expression of a face and the like, which are inputted from the television camera 31.

Note that the emotion can be also detected based solely on either of the voice inputted from the microphone 11, the character information inputted from the keyboard 25 or the expression of the face inputted from the television camera 31. However, from the viewpoint of improving a detection precision of the emotion, it is more effective to comprehensively judge the information obtained from the plurality of information sources.

First, the processing relating to the voice will be described. A voice signal inputted from the microphone 11 is sampled by the A/D converter 12, and then converted to a digital signal. The digital signal of the voice obtained at an output terminal of the A/D converter 12 is inputted to the voice recognition unit 20.

The signal processing unit 13 extracts frequency components necessary for intensity detection of the voice. The intensity detecting unit 17 detects the intensity from the signal extracted by the signal processing unit 13. For example, a result obtained by averaging the magnitude of the amplitude of the voice signal can be used as the intensity.

An averaging cycle for detecting the intensity of the voice is set to about 10 seconds, for example. Note that, when segmentations for respective sentences are detected in spite of an averaging cycle shorter than 10 seconds, periods of time from the beginning of the sentence to the detection of the segmentation are averaged. Specifically, the intensity of the voice for each sentence is detected.

The phoneme detecting unit 14 provided in the voice recognition unit 20 detects segmentations for each phoneme of the voice inputted thereto. For example, when the sentence expressed by "kyou wa ii tenki desune" (in Japanese) is inputted in the form of a voice, the segmentations for each phoneme like "kyo/u/wa/i/i/te/n/ki/de/su/ne" (in Japanese) are detected.

The word detecting unit 15 provided in the voice recognition unit 20 detects segmentations for each word of the voice inputted thereto. For example, when the sentence expressed by "kyou wa ii tenki desune" (in Japanese) is inputted in the form of a voice, the segmentations for each word like "kyou/wa/ii/tenki/desune" (in Japanese) are detected.

The sentence detecting unit 16 provided in the voice recognition unit 20 detects segmentations for each sentence of the voice inputted thereto. When a voiceless state of a specific length or more is detected, it is considered that the segmentation for each sentence appears. For a threshold value of the length of the voiceless state, the value of about 0.1 to 0.2 second is allocated. Moreover, this threshold value is not constant, but this threshold value is changed automatically so that it reflects an emotion state detected immediately before.

The tempo detecting unit 18 receives the signal of the segmentation for each phoneme outputted from the phoneme detecting unit 14, and detects the number of phonemes that appeared at a unit time. As to a detection cycle of the tempo, a time of about 10 seconds, for example, is allocated. However, when the segmentation of the sentence is detected, counting for the number of phonemes is stopped up until the time point of the detection of the segmentation of the sentence even if the segmentation of the sentence is detected within 10 seconds, and a value of the tempo is calculated. Specifically, the tempo is detected for each sentence.

The digital signal from the A/D converter 12 is divided for each word in which the segmentations are detected by the word detecting unit 15, and the voice signal is inputted to the intonation detecting unit 19. From the voice signal inputted to the intonation detecting unit 19, the intonation detecting unit 19 detects the intonation expressing an intensity-change pattern of the voice in the word and in the segmentation for each sentence in the sentence detecting unit 16. Thus, the intonation detecting unit 19 detects the characteristic intensity pattern in the segmentation.

As shown in FIG. 2, a bandpass filter 51, an absolute value conversion unit 52, a comparison unit 53, an area center detecting unit 54 and an area interval detecting unit 55 are provided in the intonation detecting unit 19. Examples of the waveforms of the signals SG1, SG2, SG3 and SG4 of respective input or output terminals in the intonation detecting unit 19 are illustrated in FIG. 4. Note that the ordinate of each signal in FIG. 4 indicates the amplitude or the intensity. Moreover, in the examples of FIG. 4, the length of one word taken out from the voice is about 1.2 seconds.

The bandpass filter 51 extracts only the frequency components necessary for the detection of the intonation from the signal SG1 inputted thereto. In this embodiment, only the frequency components within the range of 800 to 1200 Hz appear at an output terminal of the bandpass filter 51 as the signal SG2. Referring to FIG. 4, it is found that the pattern of the intensity-change owing to the intonation in the word appears in the signal SG2.

In order to simplify calculation processing of the signal, the absolute value conversion unit 52 is provided in the intonation detecting unit 19. The absolute value conversion unit 52 converts the amplitude of the inputted signal to its absolute value. Accordingly, the signal SG3 illustrated in FIG. 4 appears at an output terminal of the absolute value conversion unit 52.

The comparison unit 53 compares the magnitude of the signal SG3 with the threshold value, and outputs only components larger than the threshold value as the signal SG4. Specifically, the comparison unit 53 outputs only the components having large values in the power spectrum of the signal SG3. The threshold value applied to the comparison unit 53 is determined appropriately by a method called a decision analysis method.

Referring to FIG. 4, the two areas A1 and A2 corresponding to intonation pattern in the word of the voice appear in the signal SG4. The area center detecting unit 54 detects the times t1 and t2 at which positions corresponding to the respective centers of the two areas A1 and A2 appear.

The area interval detecting unit 55 detects a time difference concerning the two times t1 and t2, which are detected by the area center detecting unit 54, as an area interval Ty. The value of this area interval Ty corresponds to the intonation pattern in the word of the voice. Actually, a result obtained by averaging the values of the area intervals Ty is used as a value of the intonation.

In one word, three or more areas may appear in the signal SG4. When the three or more areas appear, the area intervals Ty are respectively calculated for the two areas adjacent to each other, and a result obtained by averaging the plurality of obtained area intervals Ty is used as the value of the intonation.

An emotion state of a human changes, for example, as illustrated in FIG. 3. Furthermore, in order to correctly grasp emotions including anger, sadness, pleasure and the like, it is inevitable to detect a change of an amount of characteristic such as the intensity, the tempo, and the intonation.

In the emotion detecting system illustrated in FIG. 1, in order to make it possible to refer to amounts of characteristic in the past, the value of the intensity outputted by the intensity detecting unit 17, the value of the tempo outputted by the tempo detecting unit 18 and the value of the intonation outputted by the intonation detecting unit 19 are temporarily stored in the temporary data storage unit 21.

Furthermore, the emotion change detecting unit 22 receives the present value of the intensity outputted by the intensity detecting unit 17, the present value of the tempo outputted by the tempo detecting unit 18, and the present value of the intonation outputted by the intonation detecting unit 19. The emotion change detecting unit 22 also receives the past (a little before the present time) values of the intensity, the tempo, and the intonation, which are stored in the temporary data storage unit 21. Thus, the emotion change detecting unit 22 detects the change of the state of emotion. Specifically, the emotion change detecting unit 22 detects the changes in the intensity, tempo, and intonation of the voice, respectively.

The voice emotion detecting unit 23 receives the changes of the intensity, tempo, and intonation of the voice, which are outputted by the emotion change detecting unit 22, and estimates the present state of the emotion. The voice emotion detecting unit 23 estimates three states including anger, sadness and pleasure as the state of the emotion in this embodiment.

In the emotion pattern DB 24, previously stored are information allowing a state of the anger to relate to patterns of the changes of the intensity, tempo, and intonation of the voice, information allowing a state of the sadness to relate to patterns of the changes of the intensity, tempo, and intonation of the voice and information allowing a state of the pleasure to relate to patterns of the changes of the intensity, tempo, and intonation of the voice.

The voice emotion detecting unit 23 estimates the present state of the emotion based on the patterns of the change of the intensity, the change of the tempo and the change of the intonation, which are outputted by the emotion change detecting unit 22, with reference to the information retained in the emotion pattern DB 24 as an estimation rule.

The information expressing the three types of states including the anger, the sadness and the pleasure, which have been estimated by the voice emotion detecting unit 23, are inputted to the emotion recognition unit 60 and the emotion and sensibility memory DB 41. The emotion and sensibility memory DB 41 sequentially receives and stores the present states of the emotion, which are inputted from the voice emotion detecting unit 23.

Accordingly, the past state of the emotion can be reproduced by reading out the information stored in the emotion and sensibility memory DB 41.

Meanwhile, the contents of the sentence inputted from the microphone 11 as a voice (speech contents of the partner) is recognized by the sentence recognition unit 26. The character information corresponding to the respective phonemes recognized by the voice recognition unit 20 and the information expressing the segmentation of the word and the segmentation of the sentence are inputted to the sentence recognition unit 26. Moreover, the character information inputted from the keyboard 25 is also inputted to the sentence recognition unit 26.

The sentence recognition unit 26 recognizes an inputted character string for each word and analyzes the syntax thereof to grasp the contents of the sentence as a natural language. Actually, the sentence recognition unit 26 recognizes speech information expressing "5W3H", that is, "Who", "What", "When" "Where", "Why", "How", "How long, How far, How tall and so on" and "How much". The speech information recognized by the sentence recognition unit 26 is inputted to the emotion recognition unit 60.

Next, processing for detecting the emotion based on a look on the partner's face will be described. The television camera 31 photographs at least a facial part of the human who will be the subject of the emotion detecting system of FIG. 1. The image photographed by the television camera 31, that is, an image including the look on the human face is inputted to the image recognition unit 32.

Note that the information of the image photographed by the television camera 31 is inputted to the character recognition unit 39. Specifically, the character recognition unit 39 recognizes the respective characters of a sentence from a photographed image when the image of the sentence is photographed by the television camera 31. The character information recognized by the character recognition unit 39 is inputted to the sentence recognition unit 26.

The image recognition unit 32 recognizes characteristic elements from the inputted image. Concretely, the image recognition unit 32 recognizes respective parts of eyes, mouth, eyebrows, and cheekbones in the face of the subject, and detects respective relative positions of eyes, mouth, eyebrows and cheekbones in the face. Moreover, the image recognition unit 32 always traces the respective positions of eyes, mouth, eyebrows and cheekbones, in order to detect the respective positional changes thereof following the change of the facial look and to detect an expression such as shaking one's head.

Information concerning reference positions with regard to the respective positions of eyes, mouth, eyebrows, and cheekbones in the face (information equivalent to the facial look of the subject in a normal state thereof) is stored in advance in the face pattern DB 33. Note that it is also possible to change the contents of the face pattern DB 33 arbitrarily. Moreover, rule information expressing correspondence relationships between the changes of the facial look and six types of emotions (pleasure, anger, sadness, fear, joy and surprise) is stored in advance in the face pattern DB 33.

The face emotion detecting unit 34 detects the amounts of characteristic of the look, that is, a difference thereof from that in the normal state based on the information concerning the respective positions of eyes, mouth, eyebrows and cheekbones, which are recognized by the image recognition unit 32, and the reference positions stored in the face pattern DB 33.

Moreover, the face emotion detecting unit 34 estimates the respective states of the six types of emotions (pleasure, anger, sadness, fear, joy and surprise) based on the amounts of change and rates of the detected amounts of characteristic and on the rule information retained in the face pattern DB 33. Information expressing the estimated states of the six types of emotions is outputted from the face emotion detecting unit 34, and inputted to the emotion recognition unit 60 and the emotion and sensibility memory DB 41.

The emotion recognition unit 60 comprehensively determines the information expressing the state of the emotion (anger, sadness or pleasure) inputted from the voice emotion detecting unit 23, the speech information inputted from the sentence recognition unit 26 and the information expressing the state of the emotion (pleasure, anger, sadness, fear, joy or surprise) inputted from the face emotion detecting unit 34. Then, the emotion recognition unit 60 estimates the final state of the emotion. Regarding the speech information, the state of the emotion (pleasure, anger, sadness, fear, joy or surprise) included therein can be estimated by determining the contents (5W3H) of the sentence in the speech in accordance with a predetermined rule.

The information expressing the state of the emotion estimated based on the voice by the voice emotion detecting unit 23, the information concerning the speech contents recognized by the sentence recognition unit 26 based on the voice or the characters inputted from the keyboard 25, and the information expressing the state of the emotion estimated from the facial look by the face emotion detecting unit 34, are respectively inputted to the emotion and sensibility memory DB 41 and sequentially stored therein. Time and date when the respective pieces of information stored in the emotion and sensibility memory DB 41 are detected are added to the information.

Among the information inputted to the emotion and sensibility memory DB 41, the information concerning the emotion, which is inputted from the voice emotion detecting unit 23, the information concerning the speech contents, which is inputted from the sentence recognition unit 26, and the information concerning the emotion, which is inputted from the face emotion detecting unit 34, must be grasped in association with one another.

Accordingly, the synchronous processing unit 43 associates the plural types of information stored in the emotion and sensibility memory DB 41 with one another in accordance with the time (inputted time) and date when such pieces of information are detected. For example, the information expressing the states of the emotions including anger, sadness and pleasure, which have been estimated by the voice emotion detecting unit 23, and the information concerning the speech contents (5W3H), are associated with each other according to the points of time thereof as shown in FIG. 6.

Incidentally, the emotion and sensibility memory DB 41 includes a sufficient storage capacity capable of storing a relatively large amount of information. However, since there are limitations on the storage capacity, it is necessary to restrict the amount of information to be stored therein in order to use this system continuously for a long period of time.

In this connection, the oblivion processing unit 42 is provided. The oblivion processing unit 42 automatically deletes old information from the emotion and sensibility memory DB 41. However, information adapted to a specific condition is not deleted but stored even if it gets old.

An operation of the oblivion processing unit 42 will be described with reference to FIG. 5.

In Step S11 of FIG. 5, with regard to each of a large number of data stored in the emotion and sensibility memory DB 41, information concerning time and date when each of the data is stored (or detected) is referred to.

In Step S12, discrimination is made as to whether or not a predetermined certain period has elapsed since the relevant data was stored, based on the current time and the time referred to in Step S11. In the case of processing old data that has been stored for a certain period since its storage time point, the processing proceeds to Step S13 and after. Relatively new data that has not yet been stored for a certain period continues to be stored as it is.

In Step S13, when the data is information expressing the state of the emotion, the amount of change of the information (difference of emotions before and after an event) is investigated. Since the processing proceeds from Step S13 to S17 when the amount of change of the emotion exceeds a predetermined threshold value, the data is stored as it is even when the data is old. When the amount of change of the emotion is equal to/less than the threshold value, the processing proceeds from Step S13 to S14.

In Step S14, the pattern of the emotion concerning the data is detected, and discrimination is made as to whether or not the relevant pattern coincides with a predetermined specific pattern. Specifically, investigation is made as to whether or not plural combinations of the states of the emotion and the speech contents coincide with a specific pattern representing a "strongly impressive" state. Since the processing proceeds from Step S14 to S17 when the detected pattern coincides with the specific pattern, the data is stored as it is even if the data is old. When the patterns do not coincide with each other, the processing proceeds from Step S14 to S15.

In Step S15, when the data is the speech contents, discrimination is made as to whether or not the contents coincide with predetermined speech contents (significantly impressive speech). Even if both of the contents do not coincide with each other completely, they can also be regarded to coincide when a similarity between the both is high. Since the processing proceeds from Step S15 to S17 when the speech contents of the relevant data coincide with the predetermined speech contents, the data is stored as it is even if the data is old.

When both of the contents do not coincide with each other in Step S15, the relevant data is deleted in Step S16.

The above-described processing is executed for the entire data in the emotion and sensibility memory DB 41. Moreover, the oblivion processing shown in FIG. 5 is executed periodically and repeatedly. An execution cycle of the oblivion processing can be arbitrarily changed as an individuality of an individual. Note that the processing is carried out in Steps S14 and S15 by referring to a previously prepared pattern DB (not shown). With regard to this pattern DB, contents thereof are automatically updated by learning information inputted thereto.

FIG. 5 shows simplified processing. Actually, the entire of the amount of change of the emotion, the pattern of the emotion and the contents of the speech are determined comprehensively. Specifically, when there exist the information in which the amount of change of the emotion is large, the information in which the pattern of the emotion coincides with the specific pattern, and the information in which the speech contents are the same or similar to the predetermined speech contents, priorities thereof are determined comprehensively. Concretely, the information in which the speech contents are the same or similar to the predetermined speech contents is given the highest priority, the information in which the pattern of the emotion coincides with the specific pattern is given the second-highest priority, and the information in which the amount of change of the emotion is large is given the lowest priority. Accordingly, the information in which the speech contents are the same or similar to the predetermined speech contents is unlikely to be deleted in the oblivion processing, and remains as a memory even if it gets old.

With regard to the old data in the emotion and sensibility memory DB 41, only the data in which the change of the emotion is large, the data having the pattern regarded as "strongly impressive", the data inputted repeatedly many times, and the data in which the speech contents are significantly impressive, are added with priorities in accordance with their strengths and contents and stored as they are by the processing as described above in the oblivion processing unit 42. Consequently, the old data in the emotion and sensibility memory DB 41 becomes incomplete data having only a part remaining therein. Such data has contents similar to a past ambiguous memory in human memory.

The past state of the emotion and the past speech contents, which have been stored in the emotion and sensibility memory DB 41, are read out to be subjected to data analysis, thus, for example, making it possible to determine whether or not the emotion detecting system operates normally and to update databases of the respective units utilized for estimating the emotion so as to improve the contents thereof.

The data stored in the emotion and sensibility memory DB 41 are further allocated in accordance with their contents, and are stored in the humanity information DB 44, the individuality information DB 45 or the specialty information DB 46.

In the humanity information DB 44, there are stored information defining a character of the subject, such as sex, age, aggressiveness, cooperativeness and current emotion, and information concerning a decision pattern of an action. In the individuality information DB 45, information such as an address of individual, current situation, current environment and speech contents (5W3H) is stored. In the specialty information DB 46, information such as occupation, carrier, occupational aptitude and occupational action decision pattern is stored.

What is outputted from the humanity information DB 44, the individuality information DB 45 and the specialty information DB 46 is moral pattern information of an individual. The sensibility of the partner can be perceived based on the moral pattern information and the past emotion of the partner.

When the function of the emotion detecting system shown in FIG. 1 is realized by software of a computer, it is satisfactory when a program executed by the computer and necessary data may be previously recorded in a recoding medium such as, for example, a CD-ROM.

Note that the microphone 11 shown in FIG. 1 may be replaced by a receiver of a telephone, and that a mouse may be provided as unit for inputting information such as characters.

Moreover, the television camera 31 shown in FIG. 1 may be replaced by any of various imaging unit such as an optical camera, a digital camera and a CCD camera.

The emotion of the subject can be detected more accurately than the conventional by using the emotion detecting method as described above.

Second Embodiment

Next, one embodiment relating to a sensibility generating method of the present invention will be described with reference to FIGS. 7 to 11.

Figure 7:
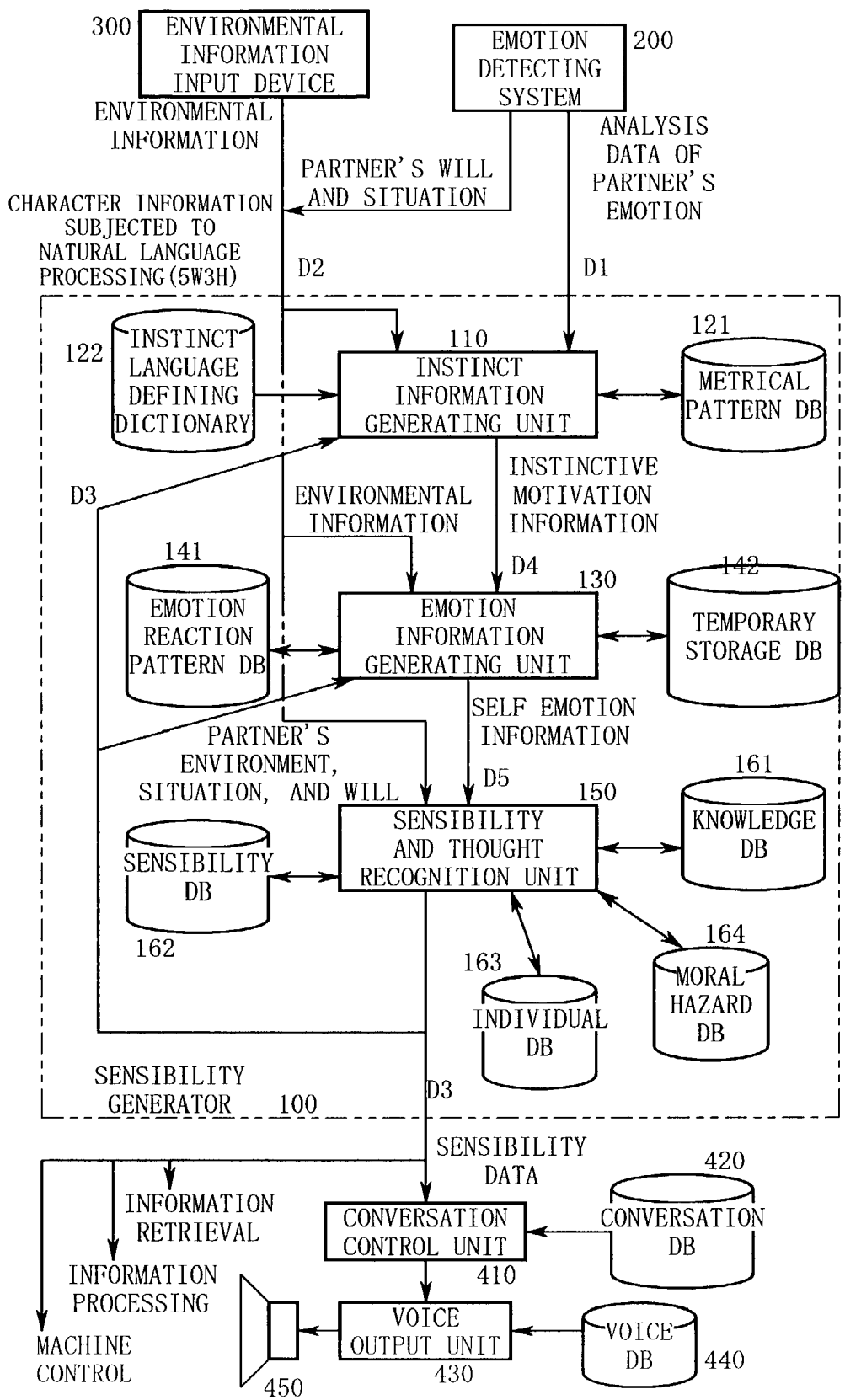
FIG. 7 is a block diagram illustrating a configuration example of a system using a sensibility generator.
Figure 8:
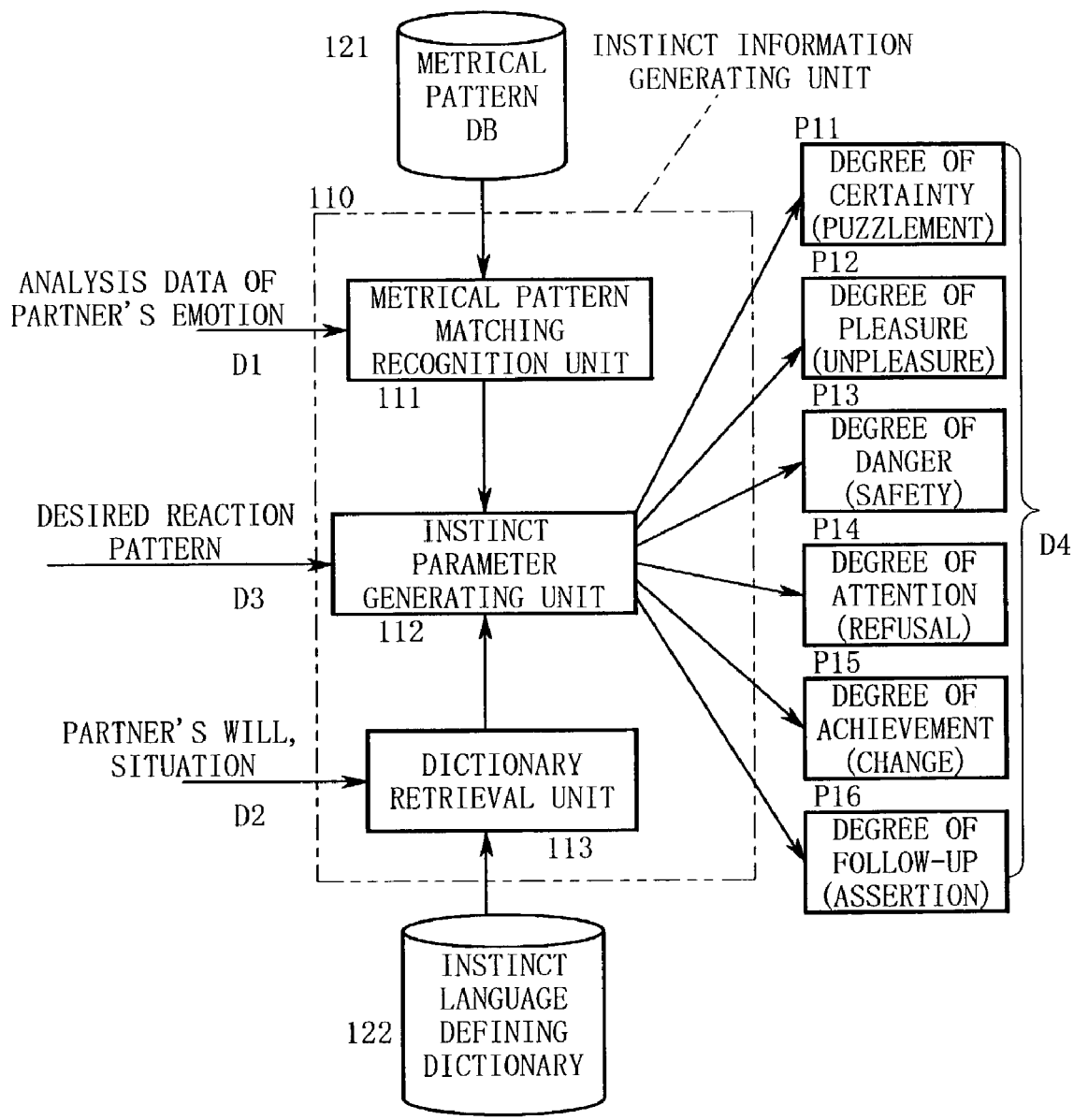
FIG. 8 is a block diagram illustrating a configuration of an instinct information generating unit.
Figure 9:
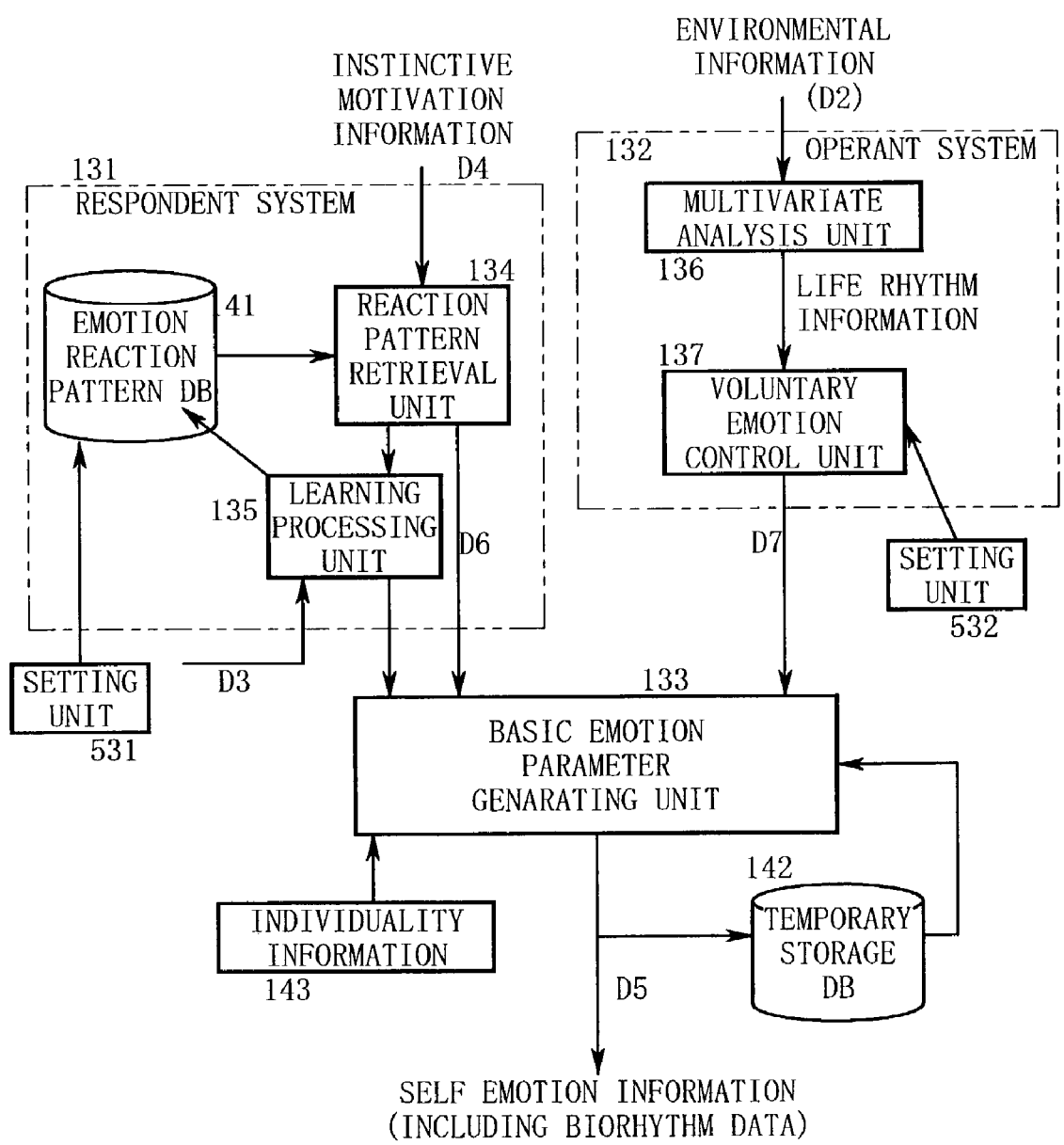
FIG. 9 is a block diagram illustrating an emotion information generating unit.
Figure 10:
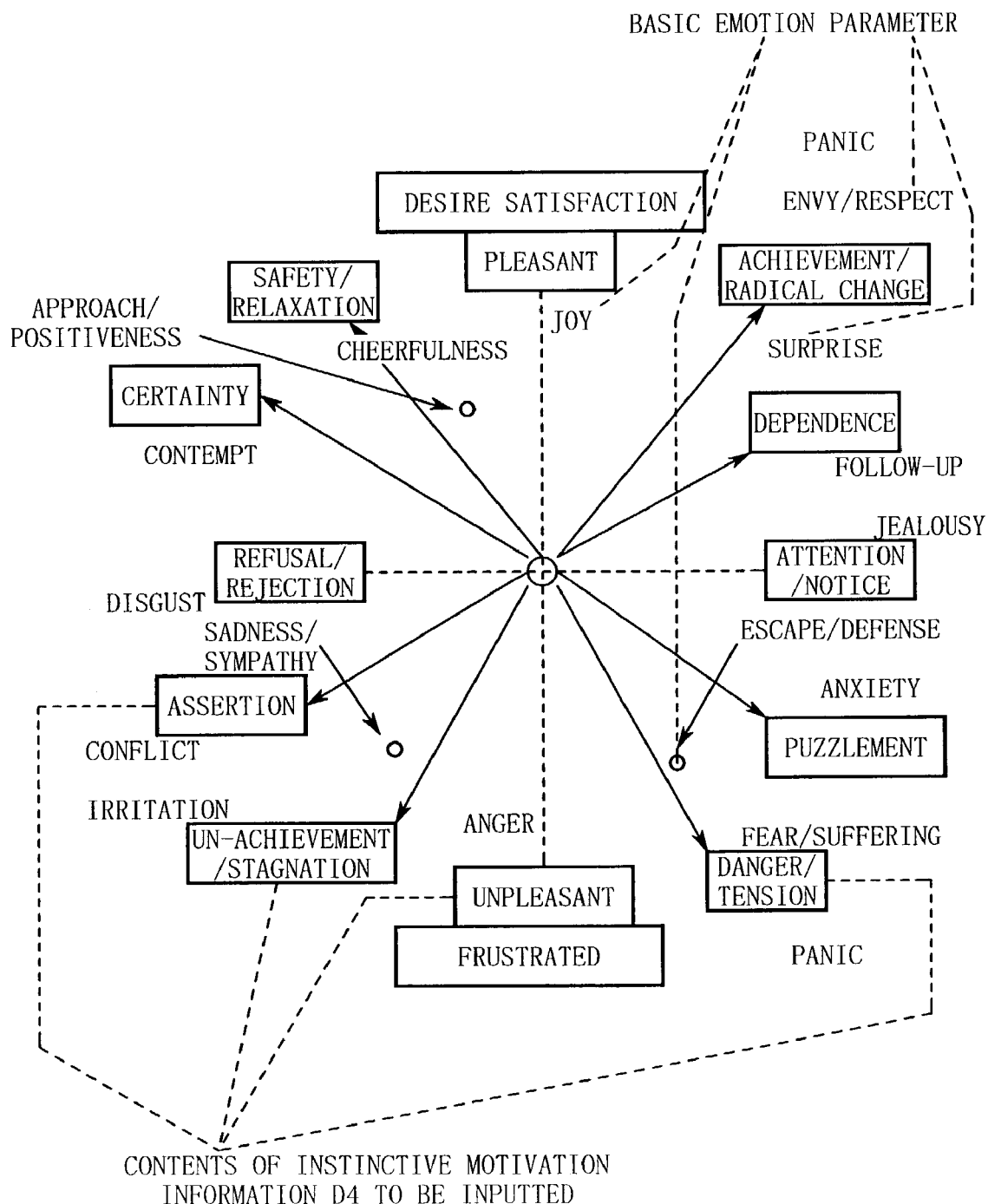
FIG. 10 is a schematic view illustrating an example of a reaction pattern model in an emotion reaction pattern DB.
Figure 11:
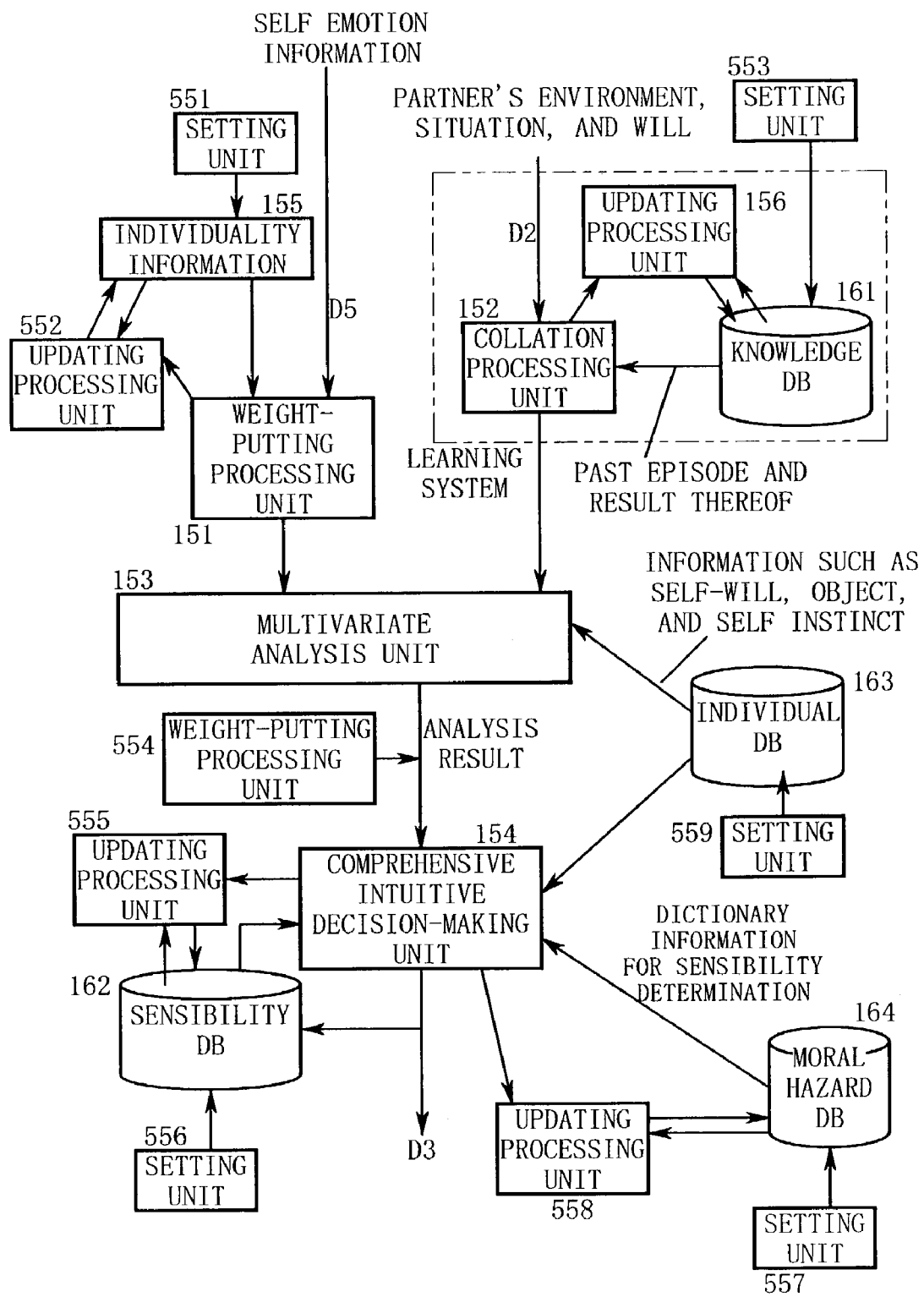
FIG. 11 is a block diagram illustrating a configuration of a sensibility and thought recognition unit.

FIG. 7 is a block diagram illustrating a configuration example of a system using a sensibility generator. FIG. 8 is a block diagram illustrating a configuration of an instinct information generating unit. FIG. 9 is a block diagram illustrating an emotion information generating unit. FIG. 10 is a schematic view illustrating an example of a reaction pattern model in an emotion reaction pattern DB. FIG. 11 is a block diagram illustrating a configuration of a sensibility and thought recognition unit.

The system shown in FIG. 7 is configured on the assumption that a natural and sensible dialog between an arbitrary human and a computer (virtual human) is realized. In this example, an emotion detecting system 200 is provided in order to detect the emotion of the human who will be a partner of the computer, and a sensibility generator 100 is provided in order to reflect the individuality and sensibility of the computer itself on the dialog.

Moreover, an environmental information input device 300 is provided in order to input a variety of environmental information to the sensibility generator 100. The environmental information input device 300 outputs information concerning, for example, date, time, weather, location and image.

The sensibility generator 100 can also be utilized for a system operating autonomously. For example, when information concerning a previously created scenario is inputted to the sensibility generator 100, then a reaction in accordance with the scenario can be obtained from the output of the sensibility generator 100. In this case, the emotion detecting system 200 is not required.

Although devices required for realizing the dialog are connected to the output of the sensibility generator 100 in the example of FIG. 7, sensibility data outputted by the sensibility generator 100 can be utilized for various purposes.

For example, in the case of utilizing the sensibility generator 100 in data communication, it is not necessary to output a voice since character information may satisfactorily be outputted. Moreover, the sensibility data outputted from the sensibility generator 100 can also be reflected on image, music, information retrieval and machine control.

Next, the configuration and operation of the sensibility generator 100 will be described. Since the same one as the emotion detecting system 200 of FIG. 1, which has been already described, is assumed for the emotion detecting system 200 in this embodiment, description thereof will be omitted.

Actually, the system shown in FIG. 7 can be composed of a computer system and a software program executed therein, or can be realized as exclusive hardware. Moreover, the software program and data to be used can be stored in an arbitrary recording medium in advance, and can be read in the computer from the recording medium for execution. Note that the system itself of FIG. 7 is referred to as a computer in the following description.

Roughly divided, two types of data, that is, data D1 and data D2 are inputted to the input of the sensibility generator 100. The data D1 is information expressing the emotion of the partner. The data D2 is character information that has been subjected to natural language processing, and includes information concerning the will, situation and environment of the partner. By the natural language processing, the data D2 is inputted as information expressing the "5W3H", that is, "Who", "What", "When" "Where", "Why", "How", "How long, How far, How tall and so on" and "How much".

Actually, it is possible to utilize a variety of information as below, as inputs to the sensibility generator 100.

(A) Change patterns of vocalism relating to temporal property, which includes stress, rhythm, tempo, pause, musical scale, musical interval, melody, harmony, frequency and the like; and degrees of basic emotions (anger, pleasure, sadness, disgust, surprise, fear and the like)

(B) Information concerning vocalism relating to tonic property, which includes accent, depth, denseness, brightness, roughness, tone color (JIS-Z8109), formant, intonation, prominence for making a certain part of a spoken language prominent to clarify a meaning, and the like (C) Word, segment contents, stress distribution in sentence, suprasegmental characteristic information, characteristic information generated by artificial intelligence, those of which relate to property of stress (D) Text information subjected to conversation analysis, episode information (including meaning information and information recognized by artificial intelligence) and the like.

Among such pieces of information, the information (A) and the information (B) are affected by intention and emotion of a speaker. Such emotion can be detected by the emotion detecting system 200.

As shown in FIG. 7, the sensibility generator 100 includes an instinct information generating unit 110, a metrical pattern DB 121, an instinct language defining dictionary 122, an emotion information generating unit 130, an emotion reaction pattern DB 141, a temporary storage DB 142, a sensibility and thought recognition unit 150, a knowledge DB 161, a sensibility DB 162, an individual DB 163 and a moral hazard DB 164.

The function of the sensibility generator 100 can be basically divided into three functional elements of the instinct information generating unit 110, the emotion information generating unit 130 and the sensibility and thought recognition unit 150. First, the instinct information generating unit 110 will be described.

As shown in FIG. 8, the instinct information generating unit 110 includes a metrical-pattern matching recognition unit 111, an instinct parameter generating unit 112 and a dictionary retrieval unit 113.

A dictionary of metrical patterns inputted to the computer (virtual human) is stored in advance in the metrical pattern DB 121 referred to by the metrical-pattern matching recognition unit 111. The meter is a rhythmic element of a speech, and represents phonetic and phonological characteristics emerging for a syllable, a word, a phrase, a sentence and the entire speech (continuous voice longer than a word). Specifically, pattern information of the computer's own, which is equivalent to the inputted information (A) and (B), is stored as individuality information in the metrical pattern DB 121.

The metrical-pattern matching recognition unit 111 compares partner's emotion analysis data D1 inputted from the emotion detecting system 200 with the metrical pattern stored in the metrical pattern DB 121, and recognizes synchronization and matching degrees of the both. Information expressing the presence of a strong tone and the emotional change emerges in the output of the metrical-pattern matching recognition unit 111.

Meanwhile, information concerning instinct stimulation is registered in advance in the instinct language defining dictionary 122. Concretely, a variety of information expressing stress allocation patterns and suprasegmental characteristics in a word or a sentence, which relate to the property of the stress, are stored as a dictionary in association with the instinct stimulation.

The dictionary retrieval unit 113 compares data D2 inputted as character information (will and situation of a partner) with the contents of the instinct language defining dictionary 122, and generates instinctive reaction information from the contents of a conversation.

The instinct parameter generating unit 112 generates instinctive motivation information D4 based on the information inputted from the metrical-pattern matching recognition unit 111, the information inputted from the dictionary retrieval unit 113 and data D3. The data D3 is information feedbacked from the output of the sensibility generator 100, and has episode and desire reaction patterns proposed by the computer.

In this example, the instinctive motivation information D4 includes six instinct parameters: a degree of certainty (or degree of puzzlement); a degree of pleasure (or degree of unpleasure); a degree of danger (or degree of safety); a degree of attention (or degree of refusal); a degree of achievement (or degree of change); and a degree of follow-up (or degree of assertion). The instinct parameter generating unit 112 decides values of the respective instinct parameters in the following manner.

Degree of pleasure (degree of unpleasure): when the computer comes close to proposed contents or a desired situation episode, the degree of pleasure is increased, and otherwise, the degree is decreased. Moreover, when the computer comes close to a meter predetermined to be pleasant, the degree of pleasure is increased, and otherwise, decreased.

Degree of danger (degree of safety): when the computer comes close to contents previously regarded as dangerous and a situation episode assumed to be dangerous, the degree of danger is increased, and otherwise, decreased. Moreover, when the computer comes close to a meter predetermined to be dangerous, the degree of danger is increased, and otherwise, decreased.

Degree of achievement (degree of change): when the computer comes close to contents predetermined to be successful/achieved and a situation episode previously assumed to be successful/achieved, the degree of achievement is increased, and otherwise, decreased. Moreover, when the computer comes close to a specific meter regarded as radically modulated, the degree of change is increased, and otherwise, decreased.

Degree of attention (degree of refusal): when the computer comes close to contents previously regarded as refused/denied and a situation episode previously assumed to be refused/denied, the degree of refusal is increased (the degree of attention is decreased), and otherwise, decreased (increased). Moreover, when the computer detects a strong or repeated assertion or comes close to a strong meter, the degree of attention is increased. When the computer comes close to a meter determined to be unpleasant, the degree of refusal is increased.

Degree of follow-up (degree of assertion): when the computer comes close to contents predetermined to be self-disparaging/self-denial and a situation episode previously assumed to be self-disparaging/self-denial, the degree of follow-up is increased (degree of assertion is decreased). When contents previously determined to be good emerge, the degree of assertion is increased (degree of follow-up is decreased). Moreover, when a meter predetermined to be uncertain emerges, the degree of assertion is increased. Note that, when the computer comes close to a strong meter, a degree of repulsion or the degree of self-denial may sometimes be increased.

Degree of certainty (degree of puzzlement): when the computer comes close to puzzled contents and an assumed situation episode, in the case where a recognition rate of various stimuli (inputs) relating to the instinct is low (for example, 70% or less), the degree of puzzlement occurs in inverse proportion to the recognition rate. The recognition rate is determined by a vocal tone and contents of a conversation.

In order to realize such control as described above, the contents desired by the computer and the meter of the situation episode are previously decided as individualities. As described above, the partner's emotion information stimulates the individual instinct of the computer, and thus the values of the respective instinct parameters are changed.

The instinctive motivation information D4 outputted from the instinct information generating unit 110 is inputted to the emotion information generating unit 130. Next, the emotion information generating unit 130 will be described.

As shown in FIG. 9, the emotion information generating unit 130 includes a reaction pattern retrieval unit 134, a learning processing unit 135, a multivariate analysis unit 136, a voluntary emotion control unit 137 and a basic emotion parameter generating unit 133.

The reaction pattern retrieval unit 134, the learning processing unit 135 and the emotion reaction pattern DB 141 compose a respondent system 131. The multivariate analysis unit 136 and the voluntary emotion control unit 137 compose an operant system 132.

The respondent system 131 is provided in order to generate an emotion caused by stimulus induction. The operant system 132 is provided in order to generate a voluntary emotion (libido).

Information concerning a reaction pattern model representing a correspondence relationship between the instinctive motivation information D4 and the basic emotion parameter is previously stored in the emotion reaction pattern DB 141 for use in the respondent system 131. This reaction pattern model can be shown, for example, as in FIG. 10.

In the case of selectively reproducing personalities of a plurality of humans by one computer, reaction pattern models, each corresponding to each of the plurality of humans or each type of individualities thereof, are registered in advance in the emotion reaction pattern DB 141, and a reaction pattern model may be selected in accordance with the individuality of the selected human.

In this example, the above-described six instinct parameters inputted as the instinctive motivation information D4 are assumed, which are: the degree of certainty (or degree of puzzlement); the degree of pleasure (or degree of unpleasure); the degree of danger (or degree of safety); the degree of attention (or degree of refusal); the degree of achievement (or degree of change); and the degree of follow-up (or degree of assertion).

As basic emotion parameters outputted from the emotion information generating unit 130, the following fifteen types of parameters are assumed. The terms in the parentheses denote instinct parameters affected by the basic emotion parameters.
1. Anger (unpleasure)
2. Joy/cheerfulness (pleasure)
3. Sadness (un-achievement/stagnation/unpleasure)
4. Surprise (achievement/impact)
5. Fear (danger/tension)
6. Suffering (danger/tension/unpleasure)
7. Disgust (rejection/refusal/unpleasure)
8. Contempt (rejection/flaccidity)
9. Approach (pleasure/safety)
10. Escape/avoidance (danger/tension/unpleasure)
11. Jealousy (unpleasure/anger/envy/attention)
12. Positiveness (safety/pleasure/certainty)
13. Dependence (achievement/follow-up)
14. Irritation/conflict (assertion/stagnation/unpleasure/danger)
15. Anxiety (danger/tension/puzzlement/unpleasure)

Reaction patterns representing relations with one or plural basic emotion parameters are stored for each of the fifteen types of basic emotion parameters in the emotion reaction pattern DB 141.

The reaction pattern retrieval unit 134 retrieves the reaction patterns of the basic emotion parameters in the emotion reaction pattern DB 141, investigates matching/mismatching thereof with the inputted instinctive motivation information D4, and outputs the information of the matched basic emotion parameters as data D6.

The learning processing unit 135 learns a probability regarding a way of pattern matching based on the information D3 outputted from the sensibility and thought recognition unit 150 and the partner's next reactive emotion outputted from the reaction pattern retrieval unit 134, and changes the contents of the emotion reaction pattern DB 141 according to results of the learning.

Meanwhile, environment information (D2) including, for example, weather information, season information, time information and the like is inputted to the input of the operant system 132. The multivariate analysis unit 136 carries out multivariate analysis for a variety of inputted environment information (D2), and consequently, outputs life rhythm information.

In the life rhythm information, there are regular (sine wave shaped) rhythms having constant cycles, such as a short-period rhythm (for example, one-hour cycle), a life rhythm (for example, 24 hour-cycle), an emotion long-period rhythm (for example, 28 day-cycle), a body long-period rhythm (for example, 23 day-cycle) and an intelligence rhythm (for example, 33 day-cycle), and there are irregular rhythms such as temperature, humidity and weather.

The voluntary emotion control unit 137 outputs the voluntary emotion (libido) among the life rhythm information outputted from the multivariate analysis unit 136 in accordance with a probability in a predetermined range.

The basic emotion parameter generating unit 133 outputs a result obtained by comprehensively determining the information concerning the basic emotion parameter and the matching rate, which are outputted from the respondent system 131 and the voluntary emotion outputted from the operant system 132, as self emotion information D5. In this case, the result is information composed of the fifteen types of basic emotion parameters.

Moreover, the outputted self emotion information D5 is temporarily stored in the temporary storage DB 142, and feedbacked to the input of the basic emotion parameter generating unit 133. The basic emotion parameter generating unit 133 receives the information feedbacked from the temporary storage DB 142 as a self emotion immediately before, and reflects the same on an emotion determination result at the next time.

When the basic emotion parameter generating unit 133 carries out comprehensive determination, it decides the priorities and degrees of influences of the respective units in accordance with an individuality determined as individuality information 143.

For example, in the case of reproducing an impulse-type emotion, the degree of influence of the respondent system 131 is increased (80% or more), and the influence of the self emotion immediately before is also increased. In the case of reproducing a thought-type emotion, the degree of influence of the respondent system 131 is decreased (30% or less), and the influence of the self emotion immediately before is also decreased under an environment where the output of the operant system 132 is stable.

The self emotion information D5 outputted from the emotion information generating unit 130 is inputted to the sensibility and thought recognition unit 150. As shown in FIG. 11, the emotion information generating unit 130 includes a weight-putting processing unit 151, a collation processing unit 152, a multivariate analysis unit 153, a comprehensive intuitive decision-making unit 154 and an updating processing unit 156.

The weight-putting processing unit 151 puts weight to the inputted self emotion information D5 in accordance with individuality information 155. The weight-put self emotion information is outputted from the weight-putting processing unit 151.

Meanwhile, character information (5W3H) including an episode representing an environment and a situation a partner is in, and the partner's will and a result thereof is inputted as the data D2 to the input of the collation processing unit 152.

The past episode, the result thereof and the meaning information expressing their meanings are stored as knowledge in the form of character information (5W3H) in knowledge DB 161 referred to by the collation processing unit 152. Moreover, the pieces of knowledge in the knowledge DB 161 include information of times when the respective data are obtained, and are arrayed in accordance with the order of the times.

In this example, the pieces of knowledge in the knowledge DB 161 can be classified into a long-term memory, a declarative memory and a procedural memory. The declarative memory is a memory stored by words, and represents the episode information as events in a specific temporal/spatial context and the meaning information as general knowledge. The procedural memory represents memories regarding a method and a technique.

The episode information includes time, place, contents, will (approval, opposition, favor and the like), person, quantity, weight, situation, state, partner's private information, affectivity, intention (object), attitude, personal relation and the like. The meaning information is equivalent to a language dictionary and a sensibility dictionary. Conceived as the private information are temper, character, emotionality, social adaptability (sociability), desire, conflict, attitude, superiority, complex, interest, properness, morality, thought pattern, emotional particularity, persistence contents (and degree thereof), taboo word, taste, good/evil criterion, and the like.

In this example, the knowledge information is stored in the knowledge DB 161 in accordance with grammars as will be described below. However, the constituent contents of the database are changed according to objects.

Story Scene+Plot+Solution
Scene=Character+Place+Time
Theme=(Event)+Target
Plot=Episode
Episode=Lower target+Attempt+Result
Attempt=Event+Episode
Result=Event+State
Solution=Event+State
Lower target, Target=Desirable state
Character, Place, Time=State Moreover, new information is sequentially added to the knowledge DB 161 by the operation of the updating processing unit 156. Furthermore, unrequired information is automatically deleted from the knowledge by the oblivion processing performed repeatedly. Specifically, the data is sequentially deleted from the one getting older on the time basis except the data having higher priorities. For example, priority is given to the knowledge utilized repeatedly and the data determined to have a strong impression, and even if they get old, they are not deleted. The degree of oblivion and the priorities of the respective data can be changed according to the individuality.

From the knowledge DB 161, the collation processing unit 152 retrieves and extracts a past episode and a result thereof, which are close to the inputted data D2, on the basis of the inputted data D2. Then, the collation processing unit 152 collates the inputted data with the extracted knowledge.

A learning processing system 157 generates information concerning one's own concept of values for the inputted episode based on the result thereof by learning. Specifically, the learning processing system 157 puts degrees on satisfaction, pleasure and unpleasure from the result of the inputted episode.

The multivariate analysis unit 153 multivariately analyzes: weight-put emotion information inputted from the weight-putting processing unit 151; the episode information and the result information, both of which are inputted from the collation processing unit 152; the information concerning the one's own concept of values, which is inputted from the learning processing system 157; and the information concerning the will and instinct of one's own, which is inputted from the individual DB 163. Then, the multivariate analysis unit 153 outputs the result of the analysis to the comprehensive intuitive decision-making unit 154.

The comprehensive intuitive decision-making unit 154 utilizes the contents of the individual DB 163 and moral hazard DB 164 as a determination dictionary, comprehensively determines the information inputted from the multivariate analysis unit 153, and outputs what is to be voluntarily executed and a result thereof as the data D3.

A variety of information as will be described below is stored as dictionary information in the individual DB 163.

1. Individuality Information (a) Determination criteria in accordance with degrees for each type of individuality: conceived as types are stereotype, other-oriented type, inward-oriented type, tradition-oriented type, offense-oriented type, cooperation-oriented type, stress-beating type, stress-releasing type and the like. The degree of achievement motivation and the degree of reactance can also be utilized as determination criteria.

(b) Determination criteria of cognitive styles: cognitive styles by distinction between a "reflective type" and an "impulsive type" and distinction between a "field-dependent type" and a "field-independent type" are defined as determination criteria.

(c) Determination criteria by characters: in the case of the Japanese, the following that are classified by the personality test method and the TPI (Todai Personality Inventory) are utilized as determination criteria. The classified ones are: temper, character, emotionality, social adaptability (sociability), desire, conflict, attitude, complex, interest, properness, morality, thought pattern, emotional particularity, persistence contents (and degree thereof), taboo word, taste, good/evil criterion, shame criterion, sin criterion, criterion of pleasure and unpleasure, and the like.

(d) Determination criteria of negativity/bias: a bias is given to negative information in order to grasp the same negative information largely, which is then utilized for forming a character.

(e) Determination criteria of adhesion/persistence time: a degree of persistence for partner's cognitive information, episode and emotion information and a reaction correspondence time therefor are decided.

2. Id/Unconscious Reaction Reference Information:

(a) Word dictionary and clause dictionary, each having contents that stimulate instincts.

(b) References of a variety of instinct reaction times for a degree of perseverance, a degree of adhesion and a degree of straightforwardness for each individuality.

(c) Self instinct pattern corresponding to a partner's emotion decided as individuality.

3. Reference Information of Homeostasis (Inhibition): Determination Criteria for Attempting to Maintain the Entire Instinct Outputs to be Stable in Harmony.

4. Self-Conscious Reaction Reference Time: Information of Determination Criteria Representing One's Own Will by Individuality.

Moreover, in the determination dictionary, included are: information utilized for recognition determination and identification determination such as true/false, correct/incorrect and adequate/inadequate; information utilized for instinct determination such as pleasure/unpleasure; information utilized for individual cognitive determination for subjects, such as complicatedness, weight and the like; information utilized for relative cognitive determination between subjects, such as equality, size, difference and similarity; information utilized for meta-memory determination such as a degree of certainty for memory and accurateness of knowledge; information utilized for abstract determination such as truth, virtue, love and the like; information utilized for inductive determination; and the like.

Dictionary information concerning occupational moral, individual moral, basic moral and the like is stored in the moral hazard DB 164.

For example, as the occupational moral, "As an architect, I require a complete calculation", "I put the highest priority to my job", "I have a pride that I am a professional" and the like are registered. Moreover, as the individual moral, "I value women (I do not boss around men)", "I am proud of my hometown", "I am proud that I am Japanese" and the like are registered. As the basic moral, "Killing a man is bad", "I take good care of my parents", "I am a man (woman)" and the like are registered.

The comprehensive intuitive decision-making unit 154 analyzes the information concerning the self emotion, which is generated by the emotion information generating unit 130, by the weight-putting processing unit 151, the collation processing unit 152 and the multivariate analysis unit 153. Then, the comprehensive intuitive decision-making unit 154 inhibits the analyzed information concerning the self emotion based on the determination dictionary in the individual DB 163, which represents the individuality and will of this computer, and on the determination dictionary in the moral hazard DB 164. Subsequently, the comprehensive intuitive decision-making unit 154 decides to what, what kind of and how much self emotional reaction (sensibility) is to be outputted. In the case of this decision, an environment and a situation a partner is in, and the partner's will at that time are reflected.

The sensibility and thought recognition unit 150 includes functions as will be described below.

1. In the case of detecting a strong impression or vocabulary or a radical emotion change, a determination cycle is changed according to the individuality. For example, when strong contents are suddenly asserted in a loud voice, the determination cycle is shortened.

2. In response to one's own biorhythm depending on the individuality, sensibility determination is carried out differently depending on whether or not one is willing to do something.

3. In accordance with one's own pleasure/unpleasure and an amount of emotion, different sensibility determination is carried out.

4. Reasonable value judgment is carried out for information expressing the present situation according to the knowledge on the knowledge DB 161, the influence of the judgment result of the emotion is reflected, and thus a final will is decided.

5. When value judgment is carried out, the judgment is made from the respective viewpoints of a social value, an occupational value, a daily-life value, an individual value and the like. Moreover, each of the social value, the occupational value, the daily-life value and the individual value is distinguished in more detail, and the judgment is made. For example, with regard to the social value, values are calculated from the respective viewpoints of religion, aesthetics, society, politics, economy and ethics.

6. Value judgment is carried out for respective factors such as satisfaction/dissatisfaction, loss and gain/interests, safety/danger and the like as judgment materials for the will decision. When the value judgment regarding the safety is carried out, for example, judgment is made in a manner as described below.

(a) When a third person is to apply "unpleasure" to a self, values regarding a hostile emotion and a defense reaction are generated.

(b) When the self is to apply the "unpleasure" to the third person, values regarding the hostile emotion and an offense reaction are generated.

(c) When the self is to take the third person's side when some other one is to apply the "unpleasure" to the third person, values regarding a favor emotion and a cooperative offense reaction are generated.

7. The generated value information is stored in the sensibility DB 162, and utilized as judgment materials thereafter.

Note that, since the sensibility and thought recognition unit 150 includes a variety of learning functions similar to those of a human, the contents of the individual DB 163 and the sensibility DB 162 are sequentially updated by building up an experience.

Since the sensibility and thought recognition unit 150 outputs results by comprehensive determination based on numerical values such as a variety of values, it does not carry out logical inference or determination as an artificial intelligence does. Specifically, the data D3 outputted from the sensibility and thought recognition unit 150 is sensibility information obtained by intuitive determination of the computer itself.

As described above, in the sensibility generating method of the present invention, the instinctive motivation information serving as motivation for generating the emotion is generated based on the inputted situation information (partner's emotion, peripheral situation and the like), and the emotion information is generated based on the instinctive motivation information. Furthermore, the generated emotion information is controlled in accordance with the individuality information.

Therefore, an emotion controlled by the reason and will of the individuality, that is, the sensibility information can be outputted. Moreover, since the emotion information is generated through the instinctive motivation information, the generated emotion can be controlled more precisely and easily.

The emotion detecting method according to the present invention can be utilized for emotion detection in a medical field and can also be utilized in a variety of systems as a part of an artificial intelligence or an artificial sensibility. Moreover, for sensibility control for a virtual human or robot, the sensibility generating method of the present invention can be utilized in a variety of systems for a variety of purposes. Furthermore, a variety of systems, each including a dialog function between a computer and a human, can be configured by combining the emotion detecting method and sensibility generating method of the present invention.

The invention is not limited to the above embodiments and various modifications may be made without departing from the spirit and scope of the invention. Any improvement may be made in part or all of the components.

What is claimed is:

1. An emotion detecting method for detecting an emotion of a subject, comprising the steps of:
    inputting a voice signal;
    detecting an intensity of a voice and a tempo expressing speed the voice emerges at, respectively, and detecting, as a time value, intonation expressing an intensity-change pattern in each word the voice makes, based on the inputted voice signal;
    obtaining a first amount of change indicating a change in the intensity of the detected voice, in a direction of time axis, a second amount of change indicating a change in the tempo of the voice, in the direction of time axis, and a third amount of change indicating a change in the intonation in the voice, in the direction of time axis, respectively; and generating signals expressing states of emotion of at least anger, sadness, and pleasure, respectively, based on said first, second, and third amounts of change.

2. An emotion detecting system for detecting an emotion of a subject, comprising:

a voice inputting unit for inputting a voice signal;

an intensity detecting unit for detecting an intensity of a voice based on the voice signal inputted by said voice inputting unit;

a tempo detecting unit for detecting speed the voice emerges at as a tempo based on the voice signal inputted by said voice inputting unit;

an intonation detecting unit for detecting intonation expressing an intensity-change pattern in a word of the voice based on the voice signal inputted by said voice inputting unit;

a change-amount detecting unit for obtaining a first amount of change indicating a change in the intensity of the voice detected by said intensity detecting unit, in a direction of time axis, a second amount of change indicating a change in the tempo of the voice detected by said tempo detecting unit, in the direction of time axis, and a third amount of change indicating a change in the intonation in the voice detected by said intonation detecting unit, in the direction of time axis, respectively; and an emotion detecting unit for outputting signals expressing states of emotion of at least anger, sadness, and pleasure, respectively, based on the first, second, and third amounts of change detected by said change-amount detecting unit.

3. The emotion detecting system according to claim 2, wherein said intonation detecting unit includes:

a bandpass filter unit for extracting specific frequency components from the voice signal inputted separately for each word;

an area separating unit for separating a power spectrum of the signal extracted by said bandpass filter unit into a plurality of areas based on the intensity of the power spectrum; and an intonation calculating unit for calculating a value of the intonation based on time intervals between respective centers of the plurality of areas separated by said area separating unit.

4. The emotion detecting system according to claim 2, further comprising:

an imaging unit for receiving image information concerning at least a face of the subject;

an image recognition unit for detecting positional information concerning each part of the face from the image information received by said imaging unit;

an image reference information retaining unit for retaining reference information concerning an amount of characteristic in each part of the face; and an image characteristic amount detecting unit for detecting an image characteristic amount based on the positional information detected by said image recognition unit and the reference information retained by said image reference information retaining unit, and wherein said emotion detecting unit estimates a state of emotion according to a change in the image characteristic amount detected by said image characteristic amount detecting unit.

5. The emotion detecting system according to claim 2, further comprising:

an emotion information storing unit for sequentially receiving pieces of information concerning the states of emotion detected by said emotion detecting unit and for storing the pieces of information therein; and an oblivion processing unit for deleting information which has been stored for a predetermined period of time since the information was initially stored, among the pieces of information concerning states of emotion stored in said emotion information storing unit in the past, and for excluding at least information showing a larger amount of change in emotion than a predetermined amount and information matching a predetermined change pattern, from said information to be deleted.

6. The emotion detecting system according to claim 5, further comprising:

a sentence recognition unit for executing grammar analysis by processing information concerning any of the voice uttered by the subject and characters inputted by the subject, and for generating speech information expressing a meaning of a sentence; and a storage controlling unit for storing the speech information generated by said sentence recognition unit in the emotion information storing unit, in synchronous with the information concerning said states of emotion.

7. The emotion detecting system according to claim 2, further comprising:

a voiceless time determining unit for determining a reference voiceless time based on a state of emotion among the detected states of emotion; and a sentence segmentation detecting unit for detecting a segmentation of sentence of the voice by utilizing the reference voiceless time determined by said voiceless time determining unit.

8. Software including an emotion detecting program executable by a computer for detecting an emotion of a subject, wherein said emotion detecting program includes:

a step of inputting a voice signal;

a step of detecting an intensity of a voice, a tempo expressing speed the voice emerges at, respectively, and detecting, as a time value, intonation expressing an intensity-change pattern in each word the voice makes, based on the inputted voice signal;

a step of obtaining a first amount of change indicating a change in the intensity of the detected voice, in a direction of time axis, a second amount of change indicating a change in the tempo of the voice, in the direction of time axis, and a third amount of change indicating a change in the intonation in the voice, in the direction of time axis, respectively; and a step of generating signals expressing states of emotion of at least anger, sadness, and pleasure, respectively, based on the obtained first, second, and third amounts of change.

9. A sensibility generating method, comprising the steps of:

retaining beforehand pieces of individuality information determining at least reason, a predetermined characteristic, and will of a subject that generates sensibility;

generating instinctive motivation information including at least a first instinct parameter expressing a degree of pleasure, a second instinct parameter expressing a degree of danger, and a third instinct parameter expressing a degree of achievement and change, based on an inputted situation information which indicates a state of any of a partner's emotion and an environment the partner is in;
generating emotion information including a basic emotion parameter of at least pleasure, anger, and sadness, based on said instinctive motivation information generated; and
controlling said emotion information generated based on said individuality information.

10. A sensibility generator, comprising:
an instinct determining unit for inputting episode situation information indicating a partner's emotion, an environment the partner is in, and the partner's will, and for generating instinctive motivation information which indicates at least a first instinct parameter expressing a degree of pleasure, a second instinct parameter expressing a degree of danger, and a third instinct parameter expressing one of a degree of achievement and a degree of change, based on said episode situation information;
an emotion generating unit for generating emotion information including basic emotion parameters of at least pleasure, anger, and sadness, based on the instinctive motivation information outputted from said instinct determining unit;
an individuality information providing unit for providing individuality information determining at least reason and will with sensibility of a subject that generates sensibility; and
an emotion controlling unit for controlling emotion information outputted from said emotion generating unit, based on the individuality information provided from said individuality information providing unit.

11. The sensibility generator according to claim 10, wherein said emotion generating unit includes:
a life rhythm generating unit for generating information expressing any of an environment changing periodically and a life rhythm of a living body; and
a voluntary emotion controlling unit for controlling voluntary emotion in said emotion generating unit, according to the information on the life rhythm outputted by said life rhythm generating unit.

12. The sensibility generator according to claim 10, wherein said emotion generating unit includes:
an instinct-to-emotion information retaining unit for retaining pattern information which allows said basic emotion parameter and said instinctive motivation information to correspond to each other; and
a matching probability learning unit for outputting information expressing a probability of matching/mismatching of the instinctive motivation information with the pattern information of said instinct-to-emotion information retaining unit, the instinctive motivation information being outputted from said instinct determining unit.

13. The sensibility generator according to claim 10, wherein said emotion generating unit includes:
an emotion feedback controlling unit for inputting to the emotion generating unit at least its own emotion information finally generated, and for reflecting the finally generated information on its own emotion information to be generated subsequently.

14. The sensibility generator according to claim 10, wherein said emotion controlling unit reflects information of a life rhythm, which is an individuality of a subject that generates sensibility, on the emotion information to be inputted.

15. The sensibility generator according to claim 10, further comprising:
a knowledge database for storing situation information showing a past situation, a past episode, and a result of the past situation and episode;
a knowledge collating unit for retrieving and extracting past situation information analogous to newly inputted situation information from said knowledge database, and for providing the past situation information to said emotion controlling unit; and
a data update controlling unit for updating contents of said knowledge database based on the situation information showing a newly inputted situation and a result of the new situation, and for automatically deleting, from said knowledge database, situation information of low priority in the order of time in accordance with weight of the contents.

16. The sensibility generator according to claim 10, further comprising:
a voice inputting unit for inputting a voice signal;
an intensity detecting unit for detecting an intensity of a voice based on the voice signal inputted by said voice inputting unit;
a tempo detecting unit for detecting speed the voice emerges at as a tempo based on the voice signal inputted by said voice inputting unit;
an intonation detecting unit for detecting intonation expressing an intensity-change pattern in a word of the voice based on the voice signal inputted by said voice inputting unit;
a change-amount detecting unit for obtaining amounts of change in the intensity of the voice detected by said intensity detecting unit, the tempo of the voice detected by said tempo detecting unit, and the intonation in the voice detected by said intonation detecting unit, respectively; and
an emotion detecting unit for outputting signals expressing states of emotion of at least anger, sadness, and pleasure, respectively, based on the amounts of change detected by said change-amount detecting unit.

17. The sensibility generator according to claim 16, further comprising:
a voice recognition unit for recognizing the voice inputted from said voice inputting unit, and for outputting character information; and
a natural language processing unit for subjecting vocal information recognized by said voice recognition unit to natural language processing, and for generating meaning information expressing a meaning of the inputted voice.

18. Software including a program and data executable by a computer utilized for sensibility generation control, wherein said program includes:
a step of generating instinctive motivation information including at least a first instinct parameter expressing a degree of pleasure, a second instinct parameter expressing a degree of danger, and a third instinct parameter expressing any of a degree of achievement and change, based on an inputted situation information which indicates a state of any of a partner's emotion and an environment the partner is in;
a step of generating emotion information including a basic emotion parameter of at least pleasure, anger, and sadness, based on said instinctive motivation information generated;

a step of providing individuality information determining at least reason and will of a subject that generates sensibility; and a step of controlling said emotion information generated, based on said individuality information.

19. An intonation detecting method for detecting, from a voice signal, an intonation used for detecting an emotion of a subject, comprising the steps of:

inputting a voice signal;

detecting areas having same frequency components based on an intensity-change pattern in a word expressed by the inputted voice signal; and detecting time intervals at which each of said areas having the same frequency components appears, to utilize the time intervals as the intonation.

20. An intonation detecting system for detecting, from a voice signal, an intonation used for detecting an emotion of a subject, comprising:

a voice inputting unit for inputting a voice signal;

an area detecting unit for detecting areas having same frequency components based on an intensity-change pattern in a word expressed by the inputted voice signal; and an intonation detecting unit for detecting time intervals at which each of said areas having the same frequency components appears, to utilize the time intervals as the intonation.

21. A recording medium including a program executable by a computer for detecting, from a voice signal, an intonation used for detecting an emotion of a subject, comprising:

a step of inputting a voice signal;

a step of detecting areas having same frequency components based on an intensity-change pattern in a word of the inputted voice signal; and a step of detecting time intervals at which each of said areas having the same frequency components appears, to utilize the time intervals as the intonation.

* * * * *